US007954886B2

(12) United States Patent
Kinoshita et al.

(10) Patent No.: US 7,954,886 B2
(45) Date of Patent: Jun. 7, 2011

(54) FRONT STRUCTURE OF VEHICLE

(75) Inventors: Yuuji Kinoshita, Hino (JP); Osamu Nagasawa, Hino-shi (JP); Tomohiro Sugawara, Hino-shi (JP); Teruyuki Taura, Hino-shi (JP)

(73) Assignee: Hino Motors, Ltd., Tokyo (JP)

( * ) Notice: Subject to any disclaimer, the term of this patent is extended or adjusted under 35 U.S.C. 154(b) by 421 days.

(21) Appl. No.: 11/997,266

(22) PCT Filed: Jul. 6, 2006

(86) PCT No.: PCT/JP2006/313467
§ 371 (c)(1),
(2), (4) Date: Jan. 29, 2008

(87) PCT Pub. No.: WO2007/013275
PCT Pub. Date: Feb. 1, 2007

(65) Prior Publication Data
US 2010/0090501 A1    Apr. 15, 2010

(30) Foreign Application Priority Data

Jul. 29, 2005   (JP) .................................. 2005-219747
Aug. 5, 2005    (JP) .................................. 2005-228270

(51) Int. Cl.
*B62D 25/04* (2006.01)
(52) U.S. Cl. .................................................. 296/193.06
(58) Field of Classification Search ............. 296/190.01, 296/190.08, 19.1, 203.02, 203.03, 205, 29, 296/191, 210
See application file for complete search history.

(56) References Cited

U.S. PATENT DOCUMENTS

| | | | | |
|---|---|---|---|---|
| 4,634,173 A * | 1/1987 | Aonuma et al. | ......... | 296/203.04 |
| 4,883,310 A | 11/1989 | Miyazaki et al. | | |
| 5,213,391 A | 5/1993 | Takagi | | |
| 5,318,338 A * | 6/1994 | Ikeda | ............... | 296/210 |
| 5,795,014 A * | 8/1998 | Balgaard | ......... | 296/210 |
| 6,578,909 B1 * | 6/2003 | Reed et al. | ........... | 296/210 |
| 6,962,389 B2 * | 11/2005 | Katsuma | .......... | 296/187.12 |
| 7,290,831 B2 * | 11/2007 | Poss et al. | ........ | 296/203.03 |
| 7,407,222 B2 * | 8/2008 | Anderson et al. | ...... | 296/193.06 |

FOREIGN PATENT DOCUMENTS

| | | |
|---|---|---|
| JP | 63-240479 | 10/1988 |
| JP | 64-45582 | 3/1989 |
| JP | 64-45582 U | 3/1989 |
| JP | 03-14776 | 1/1991 |
| JP | 03-208777 | 9/1991 |
| JP | 2748683 B2 | 9/1991 |
| JP | 2000-233768 | 8/2000 |
| JP | 2000233768 A | 8/2000 |
| WO | WO-2006038430 A1 | 4/2006 |

* cited by examiner

*Primary Examiner* — H Gutman
(74) *Attorney, Agent, or Firm* — Kubovcik & Kubovcik

(57) ABSTRACT

A vehicular front structure is configured so that stresses do not concentrate in the upper joint part and the lower joint part of a front pillar, and even if the front pillar is made thin, the joint strength of the upper and lower parts of the front pillar is improved.
The upper part of a front pillar (17) is joined to the side end part of a roof header member (41) and the front end part of a roof side member (42) via an upper joint panel (43). The front pillar is provided between the side edge of a windshield glass and the front edge of a side door and is formed in a tubular shape by the joint of a pillar inner panel (31) and a pillar outer panel (32), and the roof header member is provided along the upper edge of the windshield glass and is formed into a substantially tubular shape by the joint of a header inner panel (44) and a roof panel (45). Also, the roof side member is provided along the upper edge of the side door and is formed into a tubular shape by the joint of a side inner panel (46) and a roof-forming member (45). Further, the upper joint panel is provided on the cab inside of the pillar inner panel.

3 Claims, 18 Drawing Sheets

Truck front

Direction of driver's sight line

PRIOR ART

Truck front

Direction of driver's sight line

PRIOR ART

PRIOR ART

PRIOR ART

_US 7,954,886 B2_

FRONT STRUCTURE OF VEHICLE

BACKGROUND OF THE INVENTION (1) Field of the Invention

The present invention relates to a structure in which the upper part of a front pillar of a truck, passenger car, bus, and the like vehicles is joined to a roof header member and a roof side member, and a structure in which the lower part of a pillar inner panel of a front pillar is joined to a cowl inner panel.

(2) Description of Related Art Including Information Disclosed Under 37 C.F.R. 1.97 and 1.98

The present applicant applied for patents for a vehicular front structure in which a front pillar of a front corner member is provided between the side edge of a windshield glass and the front edge of a side glass, and the front pillar is formed into a tubular shape by joining a pillar inner panel and a pillar outer panel to each other (for example, refer to Patent Document 1). In this vehicular front structure, as shown in FIG. 20, a roof panel 145 is integrally formed at the upper end of a pillar outer panel 132, and a cowl outer panel 163 is integrally formed at the lower end of the pillar outer panel 132. Also, a side inner panel 146 is joined to the upper end of a pillar inner panel 131, and a cowl inner panel 161 is joined to the lower end of the pillar inner panel 131. On the other hand, an outer front-side flange 132b provided at the front edge of the pillar outer panel 132 is joined to an inner front-side flange 131b provided at the front edge of the pillar inner panel 131, and a roof front-side flange 145c provided at the front edge of the roof panel 145 is joined to a header front-side flange 144b provided at the front edge of a header inner panel 144. Also, a cowl outside flange 163a provided at the upper edge of the cowl outer panel 163 is joined to a cowl inside flange 161a provided at the upper edge of the cowl inner panel 161.

On the other hand, an upper joint structure of a front pillar 217 has been known in which, as shown in FIGS. 21 and 22, the upper part of a pillar inner panel 231 of the front pillar 217, the side end part of a header inner panel 244 of a roof header member 241, and the front end part of a side inner panel 246 of a roof side member 242 are joined to each other by an upper joint panel 243. In this upper joint structure, the upper part of the pillar inner panel 231 is joined to the front end of the side inner panel 246 of the roof side member 242. Also, by the upper joint panel 243, the upper part of the pillar inner panel 231, the front end part of the side inner panel 246, and the side end part of the header inner panel 244 of the roof header member 241 are joined to each other. At this time, the upper joint panel 243 is provided on the outside of a cab from the pillar inner panel 231.

Also, a lower joint structure of the front pillar 217 has been known in which, as shown in FIGS. 23 and 24, the lower part of the front pillar 217 and the side end part of a cowl inner panel 261 are joined to each other by a lower joint panel 262. In this lower joint structure, the pillar inner panel 231 has a pillar inner body 231a provided on the inside of the cab and an inner front-side flange 231b connectingly provided at the front edge of the pillar inner body 231a. This inner front-side flange 231b is provided so as to extend along the inner surface of the windshield glass and toward the center in the width direction of this glass.

Patent Document 1: International Patent Publication No. WO 2006/038430 A1 (claim 2, paragraph [0019], FIG. 2, FIG. 3).

However, in the above-described conventional vehicular front structure described in Patent Document 1, as shown in FIG. 20, an upper notch 146b is formed in a side end flange 146a of the side inner panel 146, and a lower notch 161b is formed in the cowl inside flange 161a of the cowl inner panel 161. Therefore, stresses may concentrate in these notches 146b and 161b.

Also, in the above-described conventional upper joint structure of front pillar, as shown in FIGS. 21 and 22, the upper joint panel 243 is provided on the cab inside of the pillar inner panel 231. Therefore, unless the above-described upper notch 146b (FIG. 20) is provided, the upper end of the inner front-side flange 231b of the pillar inner panel 231 interferes with the upper joint panel 243, so that the upper part of the inner front-side flange 231b cannot be extended to the front end part of the side inner panel 246. Therefore, if the front pillar 217 is made thin to improve the noticeability on the far side of the front pillar 217 as viewed from the driver sitting on a driver's seat, there arises a problem of decreased joint strength of the upper part of the front pillar 217.

Further, in the above-described conventional lower joint structure of front pillar, in addition to the need for the above-described lower notch 161b, there arises a problem of decreased joint strength of the lower part of the front pillar 217 if the front pillar 217 is made thin to improve the noticeability on the far side of the front pillar 217 as viewed from the driver sitting on the driver's seat.

An object of the present invention is to provide a vehicular front structure in which stresses do not concentrate in the upper joint part and the lower joint part of a front pillar, and even if the front pillar is made thin, the joint strength in the upper and lower parts of the front pillar can be improved.

BRIEF SUMMARY OF THE INVENTION

The invention described in a first embodiment provides an improvement in a vehicular front structure in which the upper part of a front pillar 17 is joined to the side end part of a roof header member 41 and the front end part of a roof side member 42 via an upper joint panel 43 as shown in FIGS. 2 to 4.

The configuration of this invention is characterized in that the front pillar 17 is provided between the side edge of a windshield glass 13 and the front edge of a side door 14 and is formed in a tubular shape by the joint of a pillar inner panel 31 and a pillar outer panel 32, the roof header member 41 is provided along the upper edge of the windshield glass 13 and is formed into a tubular shape or a substantially tubular shape by the joint of a header inner panel 44 and a roof panel 45, the roof side member 42 is provided along the upper edge of the side door 14 and is formed into a tubular shape or a substantially tubular shape by the joint of a side inner panel 46 and a roof forming member 45, and the upper joint panel 43 is provided on the cab inside of the pillar inner panel 31.

In the vehicular front structure described in the first embodiment, since the upper joint panel 43 is provided on the cab inside of the pillar inner panel 31, the upper part of the pillar inner panel 31 can be projected upward without forming a notch in the pillar inner panel 31, the upper joint panel 43, the side inner panel 46, or the header inner panel 44. Thereby, without the concentration of stresses in the upper joint part of the front pillar 17, the upper part of the pillar inner panel 31 and the upper joint panel 43 can be joined to each other, and the upper part of the pillar inner panel 31 and the front end part of the side inner panel 46 can be joined to each other.

The invention described in a second embodiment is characterized in that, in the invention described in the first embodiment, the pillar inner panel 31 has a pillar inner body 31*a* provided along the direction of sight line of a driver sitting on the driver's seat of a vehicle 10, and the upper part of the pillar inner body 31*a* is projected into a plane on which the side end part of the header inner panel 44 is extended, and the upper part of the pillar inner body 31*a* is joined to the upper joint panel 43 as shown in FIGS. 2 to 4.

In the vehicular front structure described in the second embodiment, since the upper part of the pillar inner body 31*a* is projected into the plane on which the side end part of the header inner panel 44 is extended, and the upper part of the pillar inner body 31*a* is joined to the upper joint panel 43, the joint strength between the upper part of the pillar inner body 31*a* and the upper joint panel 43 can be improved, and also the joint strength between the tubular front pillar 17 and the tubular or substantially tubular roof header member 41 can be enhanced.

The invention described in a third embodiment is characterized in that, in the invention described in the second embodiment, the upper end part of the pillar inner body 31*a* is projected so as to lap on the front end part of the side inner panel 46, and the upper end part of the pillar inner body 31*a* is joined to the front end part of the side inner panel 46 as shown in FIGS. 2 to 4.

In the vehicular front structure described in the third embodiment, since the upper end part of the pillar inner body 31*a* is projected so as to lap on the front end part of the side inner panel 46, and the upper end part of the pillar inner body 31*a* is joined to the front end part of the side inner panel 46, the joint strength between the upper end part of the pillar inner body 31*a* and the front end part of the side inner panel 46 can be improved, and thereby the joint strength between the tubular front pillar 17 and the tubular or substantially tubular roof side member 42 can be enhanced.

The invention described in a fourth embodiment is characterized in that, in the invention described in the second embodiment, the pillar inner panel 31 further has an inner front-side flange 31*b* which is provided so as to connect with the front edge of the pillar inner body 31*a* and extends along the inner surface of the windshield glass 13 and toward the side edge of the glass 13, and the upper part of the inner front-side flange 31*b* is projected into the plane on which the side end part of the header inner panel 44 is extended as shown in FIGS. 2 to 4.

In the vehicular front structure described in the fourth embodiment, since the upper part of the inner front-side flange 31*b* is projected into the plane on which the side end part of the header inner panel 44 is extended, the upper part of the inner front-side flange 31*b* is formed substantially into an inverse L shape having high rigidity together with the upper part of the pillar inner body 31*a*, by which the joint strength between the front pillar 17 and the roof header member 41 can further be enhanced.

The invention described in a fifth embodiment provides an improvement in a vehicular front structure in which the lower part of a pillar inner panel 31 of a front pillar 17 is joined to the side end part of a cowl inner panel 61 via a lower joint panel 62 as shown in FIGS. 1, 2, 5 and 6.

The configuration of this invention is characterized in that the front pillar 17 is provided between the side edge of a windshield glass 13 and the front edge of a side door 14 and is formed into a tubular shape by the joint of the pillar inner panel 31 and a pillar outer panel 32, the cowl inner panel 61 is provided along the lower edge of the windshield glass 13, the pillar inner panel 31 has a pillar inner body 31*a* provided along the direction of sight line of a driver sitting on the driver's seat of a vehicle 10 and an inner front-side flange 31*b* which is provided so as to connect with the front edge of the pillar inner body 31*a* and extends along the inner surface of the windshield glass 13 and toward the side edge of the glass 13, and the lower part of the inner front-side flange 31*b* is projected to the height of the lower joint panel 62.

In the vehicular front structure described in the fifth embodiment, since the inner front-side flange 31*b* provided so as to connect with the front edge of the pillar inner body 31*a* is projected to the height of the lower joint panel 62, which is a strength member for joining the pillar inner panel 31 to the cowl inner panel 61, the cross-sectional area of the lower part of the front pillar 17 can be increased, by which the joint strength of the lower part of the front pillar 17 can be enhanced.

As described above, according to the present invention, the front pillar is formed in a tubular shape by the joint of the pillar inner panel and the pillar outer panel, the roof header member is formed into a tubular shape or a substantially tubular shape by the joint of the header inner panel and the roof panel, the roof side member is formed into a tubular shape or a substantially tubular shape by the joint of the side inner panel and the roof forming member, and further the upper joint panel is provided on the cab inside of the pillar inner panel. Therefore, the upper part of the pillar inner panel can be projected upward without forming a notch in the pillar inner panel, the upper joint panel, the side inner panel, or the header inner panel. As the result, without the concentration of stresses in the upper joint part of the front pillar, the upper part of the pillar inner panel and the upper joint panel can be joined to each other, and the upper part of the pillar inner panel and the front end part of the side inner panel can be joined to each other, so that even if the front pillar is made thin, the joint strength of the upper part of the front pillar can be improved.

Also, if the upper part of the pillar inner body provided along the direction of sight line of the driver is projected into the plane on which the side end part of the header inner panel is extended, that is, into the roof header member formed into a substantially tubular shape, and the upper part of the pillar inner body is joined to the upper joint panel, the joint strength between the upper part of the front pillar and the upper joint panel can be improved, and also the joint strength between the tubular front pillar and the tubular or substantially tubular roof header member can be enhanced.

Also, if the upper end part of the pillar inner body is projected so as to lap on the front end part of the side inner panel, and the upper end part of the pillar inner body is joined to the front end part of the side inner panel, the joint strength between the upper part of the front pillar and the front end part of the side inner panel can be improved, so that the joint strength between the tubular front pillar and the tubular or substantially tubular roof side member can be enhanced.

Also, if the upper part of the inner front-side flange, which is provided so as to connect with the front edge of the pillar inner body and extends along the inner surface of the windshield glass and toward the side edge of the glass, is projected into the plane on which the side end part of the header inner panel is extended, the upper part of the inner front-side flange is formed substantially into an inverse L shape having high rigidity together with the upper part of the pillar inner body, so that even if the front pillar is made thin, the joint strength of the upper part of the front pillar can be improved.

Further, if the front pillar is formed into a tubular shape by the joint of the pillar inner panel and the pillar outer panel, the cowl inner panel is provided along the lower edge of the windshield glass, the lower part of the inner front-side flange, which is provided so as to connect with the front edge of the pillar inner body provided along the direction of sight line of the driver and extends along the inner surface of the windshield glass and toward the side edge of the glass, is projected to the height of the lower joint panel, the inner front-side flange having high rigidity is projected to the height of the lower joint panel, which is a strength member for joining the cowl inner panel to the pillar inner panel. Thereby, the cross-sectional area of the lower part of the front pillar can be increased, and therefore the joint strength of the lower part of the front pillar can be enhanced. As the result, even if the front pillar is made thin, the joint strength of the lower part of the front pillar can be improved.

BEST MODE FOR CARRYING OUT THE INVENTION

The best mode for carrying out the present invention will now be described by reference to the accompanying drawings.

First Embodiment

Figure 1:
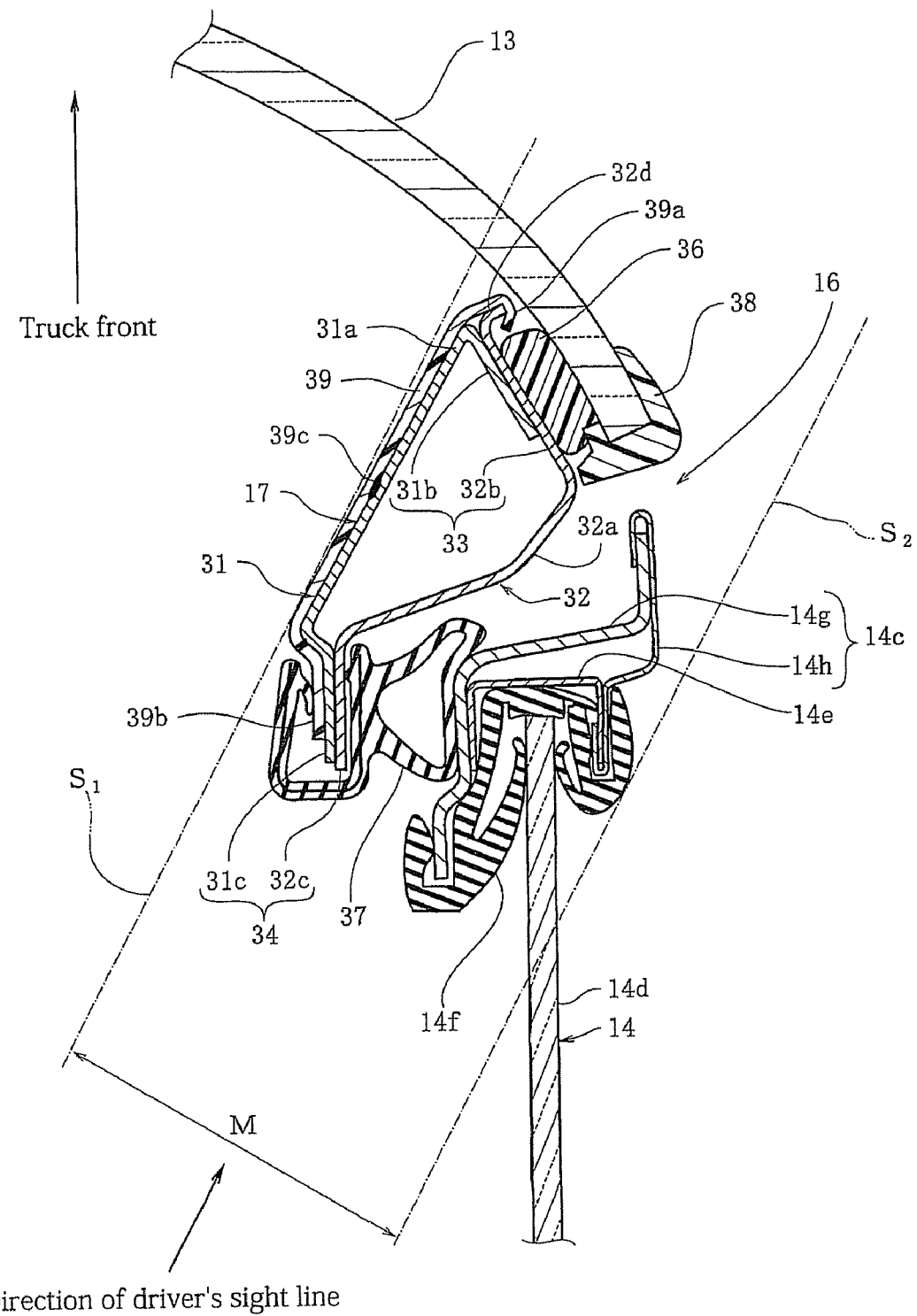
FIG. 1 is a sectional view taken along the line B-B of FIG. 8, showing a front structure of a truck in accordance with a first embodiment of the present invention.
Figure 8:
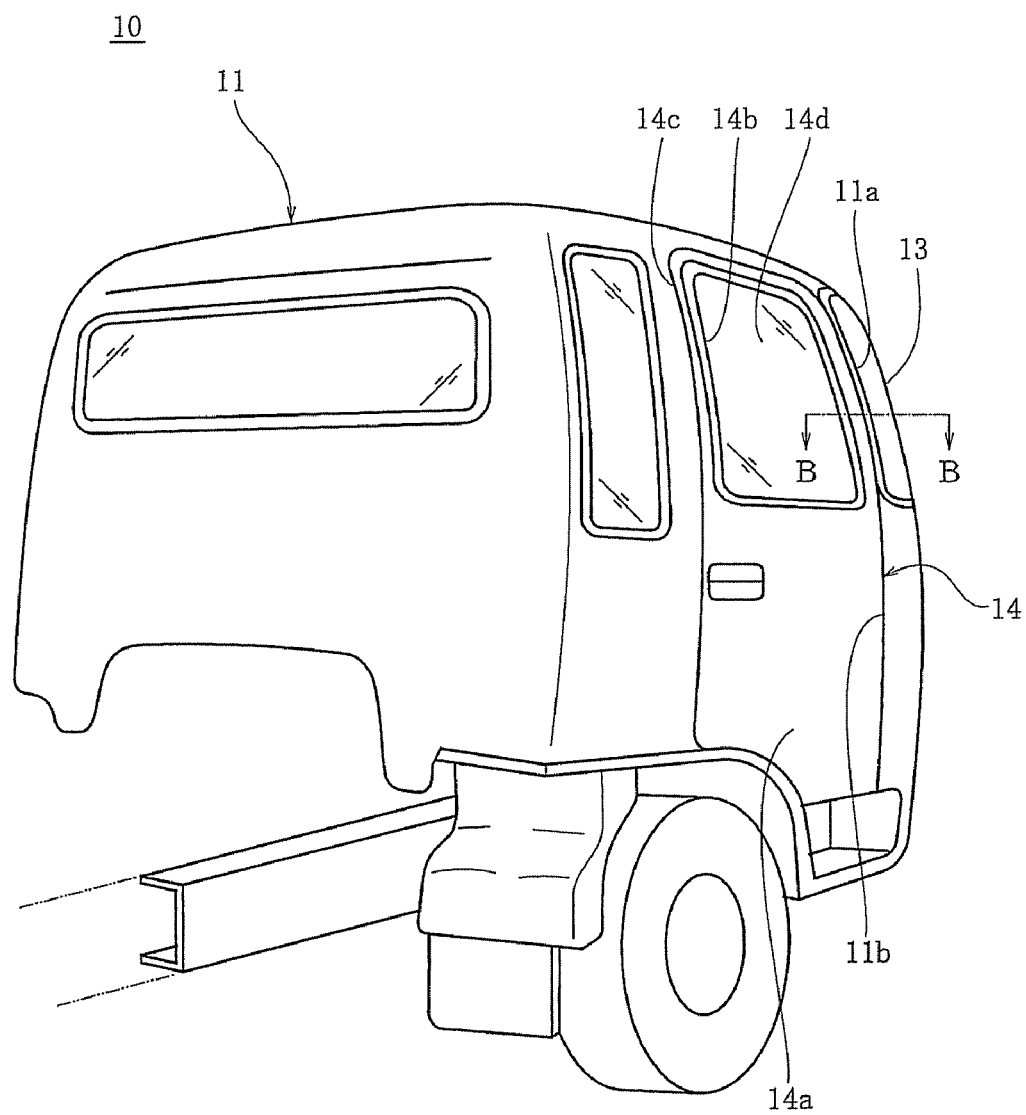
FIG. 8 is a perspective view of an essential portion of a truck including a front corner member.
Figure 9:
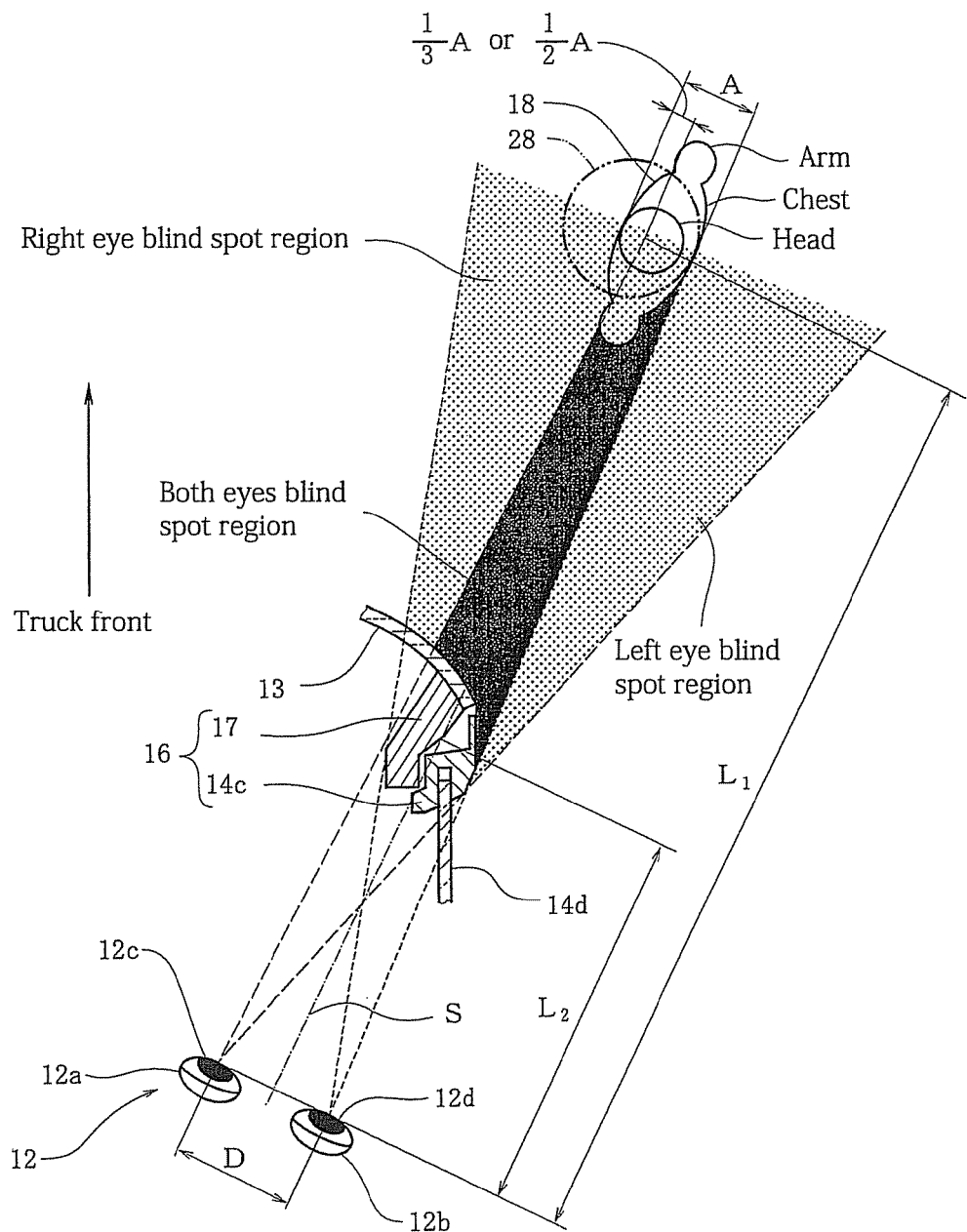
FIG. 9 is a plan view showing the positional relationship between the front corner member of the truck shown in FIG. 8, both the eyes of a driver, and an object on the outside of vehicle.
Figure 10:
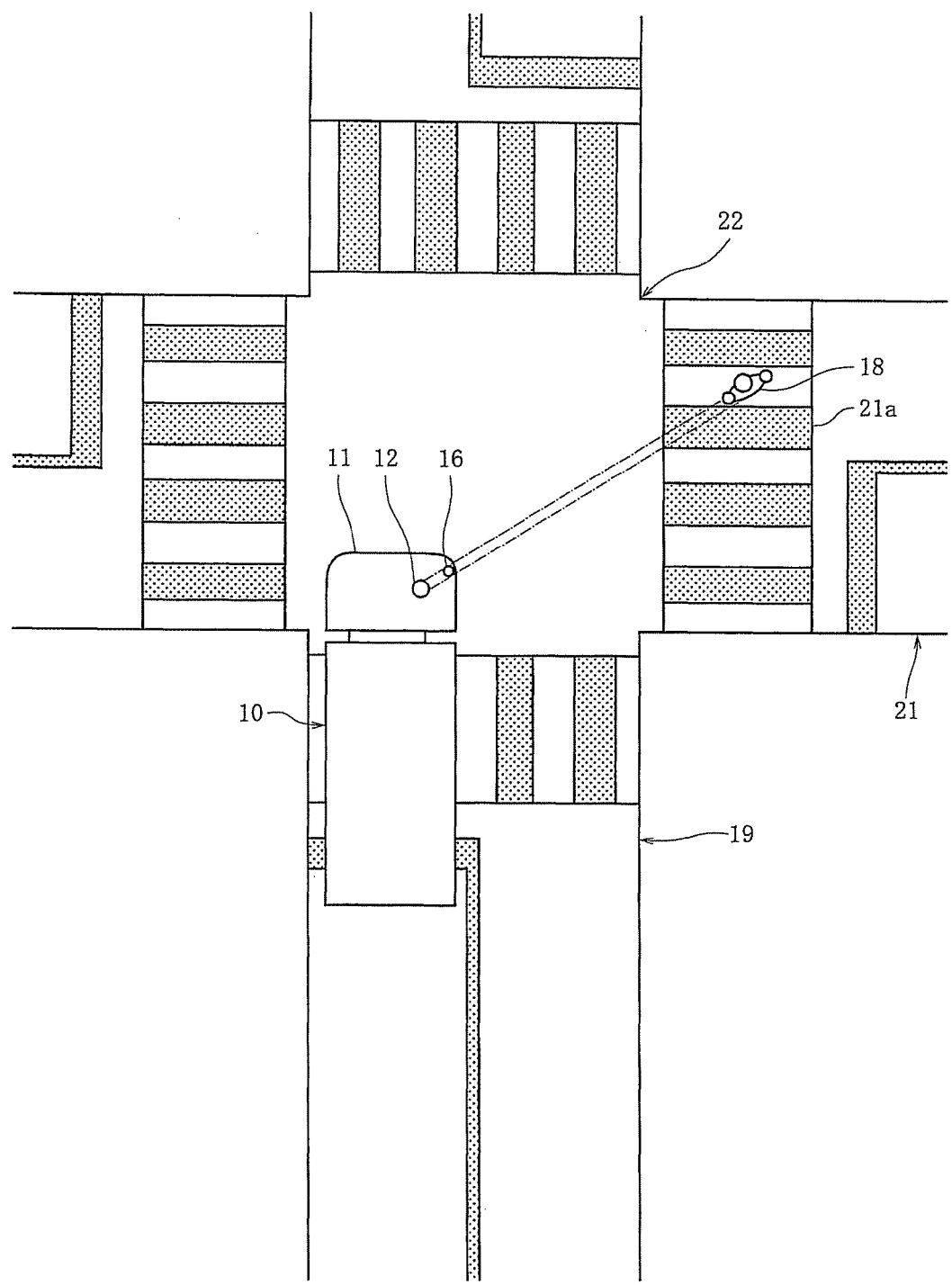
FIG. 10 is a plan view showing a state in which the truck shown in FIG. 8 turns to the right at an intersection.

As shown in FIGS. 1, 8 and 10, a driver's seat on which a driver 12 sits is provided on the right-hand side of a cab 11 of a truck 10, and a front opening 11a on the front of the cab 11 is closed by a transparent windshield glass 13. Also, on the side surface on the driver's seat side of the cab 11, a side opening 11b is provided for the driver 12 to get on and off the truck 10, and the side opening 11b is openably closed by a side door 14 (FIGS. 1 and 8). The side door 14 has a door body 14a, a doorframe 14c that is provided on the upper surface of the door body 14a and is formed substantially into an inverse U shape to form a door window 14b, and a transparent side glass 14d that openably closes the door window 14b. Between the right edge of the windshield glass 13 and the front edge of the side glass 14d, a front corner member 16 is provided so as to extend along the right edge of the windshield glass 13 and the front edge of the side glass 14d (FIGS. 1 and 9). In this embodiment, the front corner member 16 includes a front pillar 17, the doorframe 14c, a glass frame 14e, a glass run 14f, a weather strip 37, and a pillar garnish 39. The doorframe 14c is formed by joining a door inner panel 14g to a door outer panel 14h (FIG. 1). Also, the glass frame 14e is insertedly provided in the door frame 14c, and the glass run 14f is mounted in the glass frame 14e for holding and guiding the side glass 14d.

Figure 2:
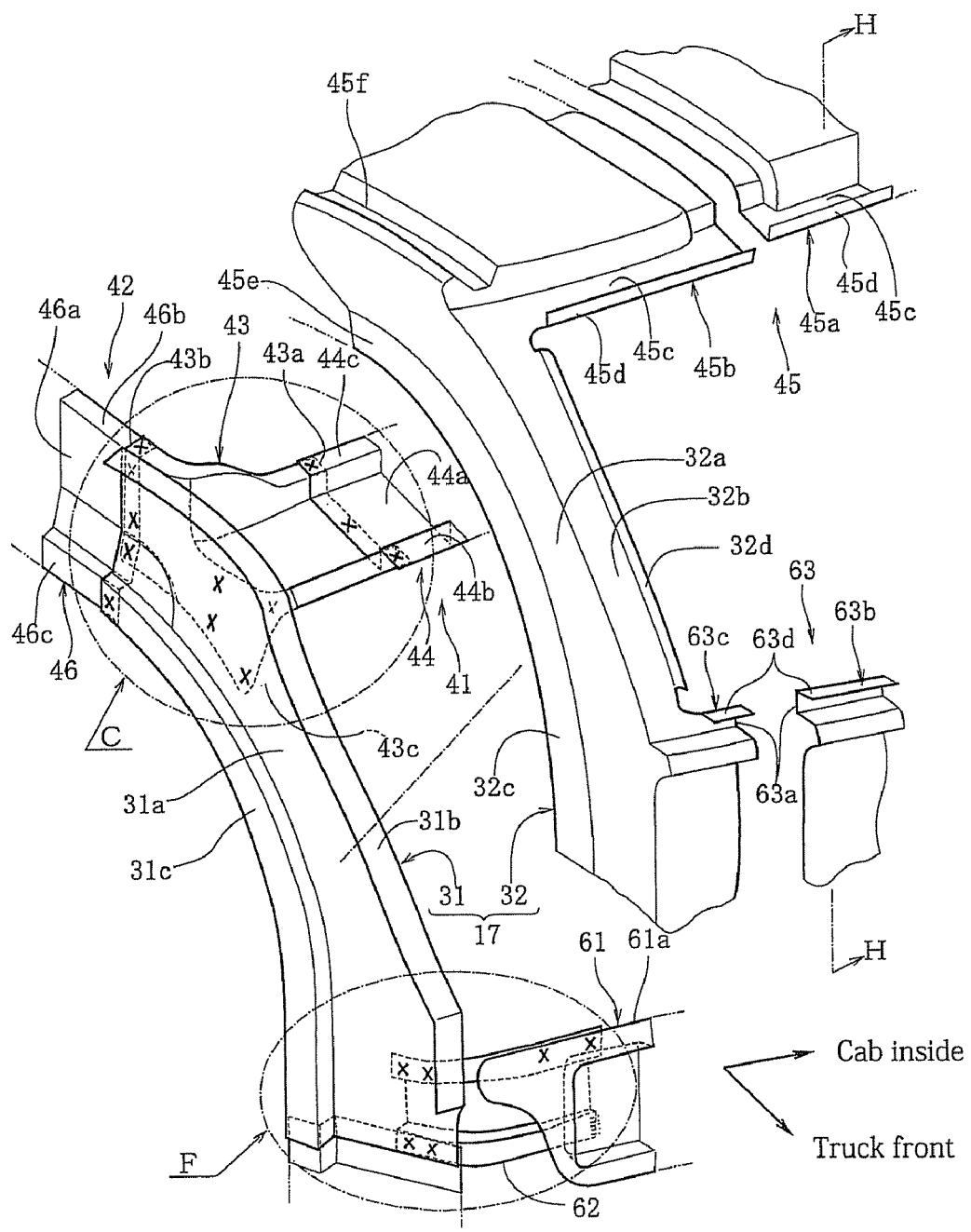
FIG. 2 is an exploded perspective view of an essential portion including a pillar inner panel and a pillar outer panel of a front pillar.

The front pillar 17 is formed into a tubular shape extending, for example, in a substantially vertical direction by joining both the side edges of a pillar inner panel 31 to both the side edges of a pillar outer panel 32 (FIGS. 1 and 2). Thereby, the transverse cross section of the front pillar 17 is formed into a closed cross section. The pillar inner panel 31 has a pillar inner body 31a provided along the direction of sight line of the driver 12 sitting on the driver's seat of the truck 10, an inner front-side flange 31b formed integrally with the pillar inner body 31a at the front edge of the pillar inner body 31a, and an inner rear-side flange 31c formed integrally with the pillar inner body 31a at the rear edge of the pillar inner body 31a. The inner front-side flange 31b is provided on the inside of the cab 11 with a predetermined gap being provided between the inner front-side flange 31b and the inner surface of the windshield glass 13 so as to be substantially parallel with the inner surface of the windshield glass 13 and to extend toward the side edge of the windshield glass 13. That is to say, the inner front-side flange 31b is provided so as to extend in the direction such as to come close to the doorframe 14c. Also, the inner rear-side flange 31c is provided on the inside of the cab 11 with a predetermined gap being provided between the inner rear-side flange 31c and the inner surface of the door frame 14c so as to be substantially parallel with the inner surface of the door frame 14c and to extend toward the rear.

On the other hand, the pillar outer panel 32 has a pillar outer body 32a provided so as to be substantially opposed to the front surface of the door frame 14c, an outer front-side flange 32b formed integrally with the pillar outer body 32a at the front edge of the pillar outer body 32a, and an outer rear-side flange 32c formed integrally with the pillar outer body 32a at the rear edge of the pillar outer body 32a (FIGS. 1 and 2). The outer front-side flange 32b is provided, on the inside of the cab 11 with a predetermined gap being provided between the outer front-side flange 32b and the inner surface of the windshield glass 13 so as to be substantially parallel with the inner surface of the windshield glass 13 and to extend in the direction opposite to the side edge of the windshield glass 13. That is to say, the outer front-side flange 32b is provided so as to extend in the direction such as to be away from the doorframe 14c. Also, the outer rear-side flange 32c is provided on the inside of the cab 11 with a predetermined gap being provided between the outer rear-side flange 32c and the inner surface of the door frame 14c so as to be substantially parallel with the inner surface of the door frame 14c and to extend toward the rear. At the end edge of the outer front-side flange 32b of the pillar outer panel 32, a pillar fold part 32d that projects toward the inner surface of the windshield glass 13 is provided.

By joining the pillar outer surface of the inner front-side flange 31b and the pillar inner surface of the outer front-side flange 32b to each other, a front lap part 33 is formed, and by joining the pillar inner surface of the inner rear-side flange 31c and the pillar inner surface of the outer rear-side flange 32c to each other, a rear lap part 34 is formed (FIGS. 1 and 2). In other words, the front lap part 33 is formed by bending the pillar inner panel 31 and the pillar outer panel 32 so that the end surface of the inner front-side flange 31b and the end surface of the outer front-side flange 32b are directed in the direction opposite to each other and by joining the flanges 31b and 32b to each other in this state, and the rear lap part 34 is formed by bending the pillar inner panel 31 and the pillar outer panel 32 so that the end surface of the inner rear-side flange 31c and the end surface of the outer rear-side flange 32c are directed in the direction opposite to each other and by joining the flanges 31c and 32c to each other in this state. For the joining of the front lap part 33, the laser welding process is preferably used, and for the joining of the rear lap part 34, the spot welding process is preferably used. Also, the front lap part 33 is provided along a glass attachment part on the side edge inner surface of the windshield glass 13. In other words, the side edge inner surface of the windshield glass 13 is attached to the pillar outer surface of the front lap part 33. Specifically, a glass adhesive 36 is packed in a gap between the front lap part 33 and the inner surface of the windshield glass 13, and by this adhesive 36, the side edge inner surface of the windshield glass 13 is attached to the front pillar 17. Thereby, the rigidity of the bonded surface of the windshield glass 13 can be enhanced because the bonded surface of the glass 13 has a double construction of the inner front-side flange 31b and the outer front-side flange 32b. Reference numeral 38 in FIG. 1 denotes a molding fitted at the peripheral edge of the windshield glass 13 to improve the appearance of the peripheral edge of the glass 13. Also, the pillar garnish 39 is provided so as to be in close contact with the pillar outer surface of the pillar inner body 31a. At the front edge of the pillar garnish 39, a locking piece 39a that is locked to the pillar fold part 32d is provided integrally with the pillar garnish 39, and at the rear edge of the pillar garnish 39, a flange cover part 39b that is in close contact with the pillar outer surface of the inner rear-side flange 31c is provided integrally with the pillar garnish 39. By bonding the pillar garnish 39 to the pillar inner body 31a with a garnish adhesive 39c such as a pressure sensitive adhesive, the adhesion between the pillar garnish 39 and the pillar inner body 31a may be improved. Further, the weather strip 37 is fitted on the rear lap part 34 and the flange cover part 39b, and has a function of closing the gap between the front pillar 17 and the door frame 14c in the state in which the side door 14 is closed.

Figure 3:
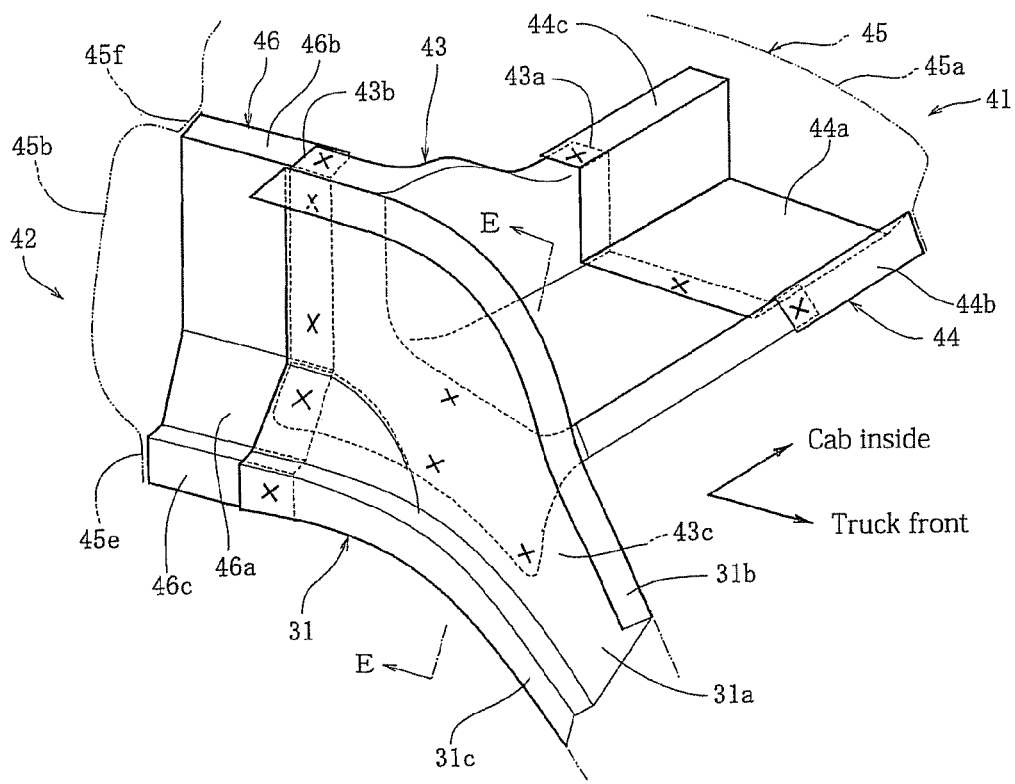
FIG. 3 is an enlarged perspective view of portion C of FIG. 2.
Figure 4:
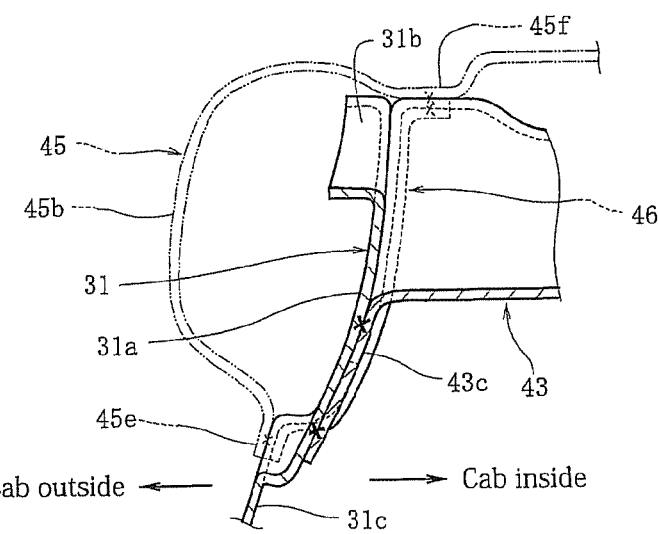
FIG. 4 is a sectional view taken along the line E-E of FIG. 3.

On the other hand, the upper part of the front pillar 17 is joined to the side end part of a roof header member 41 and the front end part of a roof side member 42 via an upper joint panel 43 by spot welding (FIGS. 2 and 3). The roof header member 41 is provided along the upper edge of the windshield glass 13, and is formed into a substantially tubular shape by the joint of a header inner panel 44 to the front edge of a roof panel 45 (FIGS. 2 to 4). Specifically, the header inner panel 44 has a header inner body 44a that is formed substantially into an inverse hat shape and extends in the vehicle width direction, a header front-side flange 44b that is formed integrally with the header inner body 44a along the front edge of the header inner body 44a, and a header rear-side flange 44c that is formed integrally with the header inner body 44a along the rear edge of the header inner body 44a. Also, the roof panel 45 has a center roof part 45a provided in the center in the vehicle width direction and a pair of side roof parts 45b joined to both side edges of the center roof part 45a (FIG. 2). At the front edge of the center roof part 45a and the front edges of the side roof parts 45b, roof front-side flanges 45c that are joined to the header front-side flange 44b are formed integrally. The roof header member 41 joins the header front-side flange 44b to the roof front-side flange 45c, and the transverse cross section thereof is formed into a substantially tubular shape (substantially into an inverse C shape) by providing a predetermined gap between the header rear-side flange 44c and the front part of the roof panel 45 (FIG. 3). Also, at the end edge of the roof front-side flange 45c, a roof fold part 45d projecting toward the inner surface of the windshield glass 13 is formed integrally (FIG. 2).

On the other hand, the roof side member 42 is provided along the upper edge of the side door 14, and is formed into a tubular shape by the joint of a side inner panel 46 to the side edge of the side roof part 45b of the roof panel 45 (FIGS. 2 to 4). Specifically, the side inner panel 46 is formed substantially into an inverse hat shape, and has a side inner body 46a extending in the travel direction of the truck 10, a side upper-side flange 46b formed integrally with the side inner body 46a along the upper edge of the side inner body 46a, and a side lower-side flange 46c formed integrally with the side inner body 46a along the lower edge of the side inner body 46a. Also, at the side edge on the opposite side to the center roof part 45a of the side roof part 45b, a roof lower-side flange 45e joined to the side lower-side flange 46c is formed integrally. In the side part on the center roof part 45a side of the side roof part 45b, a concave part 45f that extends in the travel direction of the truck 10 and is joined to the side upper-side flange 46b is formed integrally. The transverse cross section of the roof side member 42 is formed into a tubular shape by joining the side lower-side flange 46c to the roof lower-side flange 45e and by joining the side upper-side flange 46b to the concave part 45f in the side part of the roof panel 45 (FIGS. 3 and 4). Also, the side roof part 45b of the roof panel 45 and the pillar outer panel 32 are formed integrally. In this embodiment, the side edge of the side roof part 45b of the roof panel 45 is a roof-forming member joined to the side inner panel 46.

On the other hand, the upper part of the pillar inner body 31a is projected into a plane on which the side end part of the header inner panel 44 is extended, and the upper end part of the pillar inner body 31a is projected to a position at which the upper end part of the pillar inner body 31a laps on the front end part of the side inner panel 46 (FIGS. 2 and 3). Also, the upper part of the inner front-side flange 31b is projected into the plane on which the side end part of the header inner panel 44 is extended, and the upper end part of the inner front-side flange 31b is projected to a position at which the upper end part of the inner front-side flange 31b laps on the front end part of the side inner panel 46. Further, the upper joint panel 43 is formed into a substantially hexagonal shape, and has a front joint part 43a lapping on the side end part of the header inner panel 44, a side joint part 43b lapping on the front end part of the side inner panel 46 and the upper end part of the pillar inner panel 31, and a lower joint part 43c lapping on the upper part of the pillar inner panel 31 (FIGS. 2 and 3). By the above-described configuration, in the state in which the upper joint panel 43 is provided on the cab inside of the pillar inner panel 31, the upper part of the pillar inner panel 31 is joined to the side end part of the header inner panel 44 and the front end part of the side inner panel 46 via the upper joint panel 43. Specifically, the side end part of the header inner panel 44 is joined to the front joint part 43a of the upper joint panel 43, the front end part of the side inner panel 46 and the upper end part of the pillar inner panel 31 are joined to the side joint part 43b of the upper joint panel 43, and further the upper part of the pillar inner panel 31 is joined to the lower joint part 43c of the upper joint panel 43.

Figure 5:
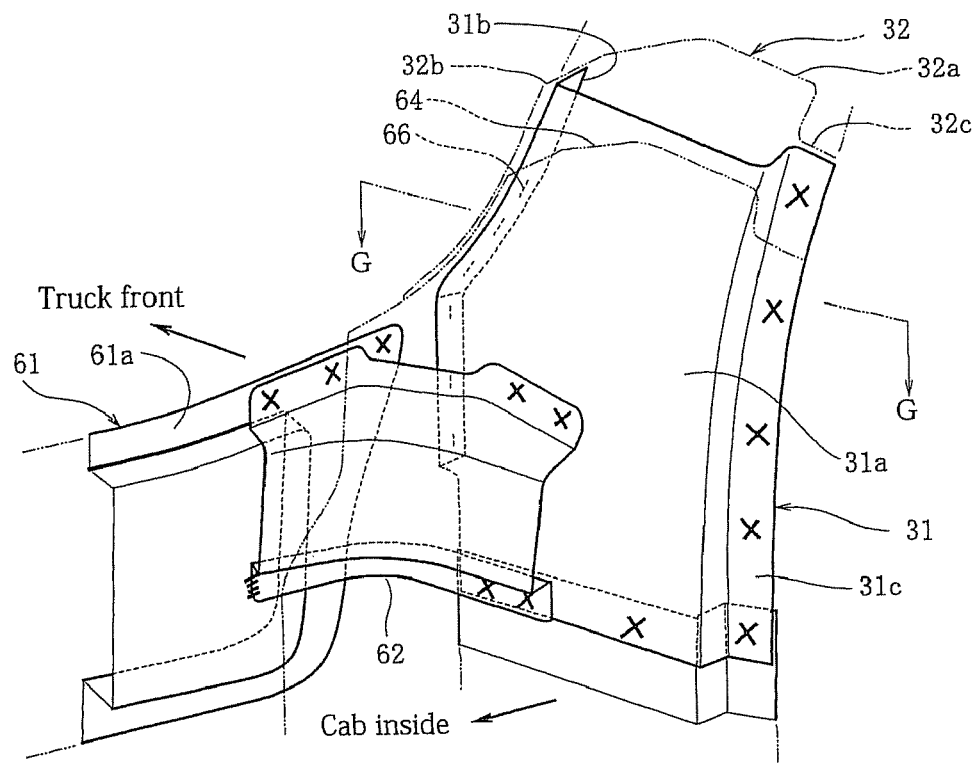
FIG. 5 is a perspective view of an essential portion, viewing portion F of FIG. 2 from the cab inside.
Figure 6:
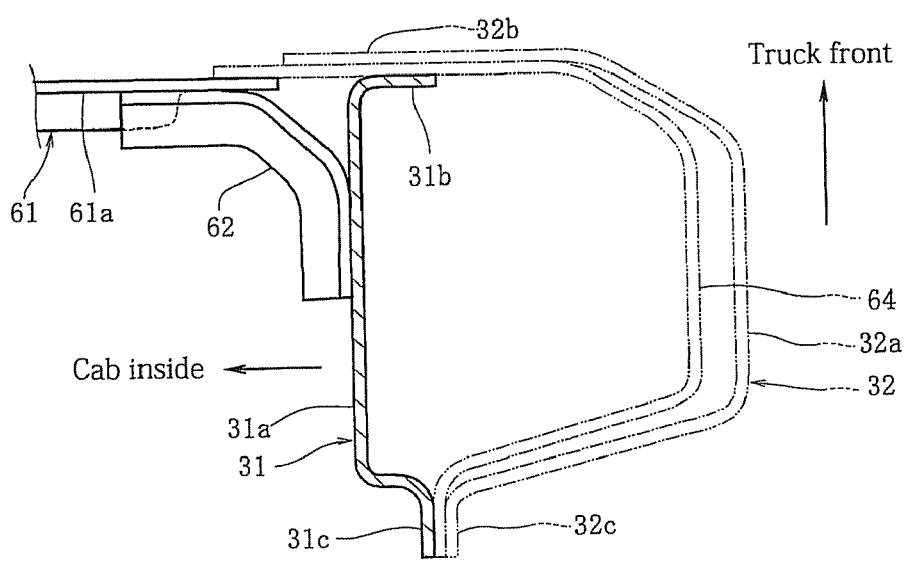
FIG. 6 is a sectional view taken along the line G-G of FIG. 5.
Figure 7:
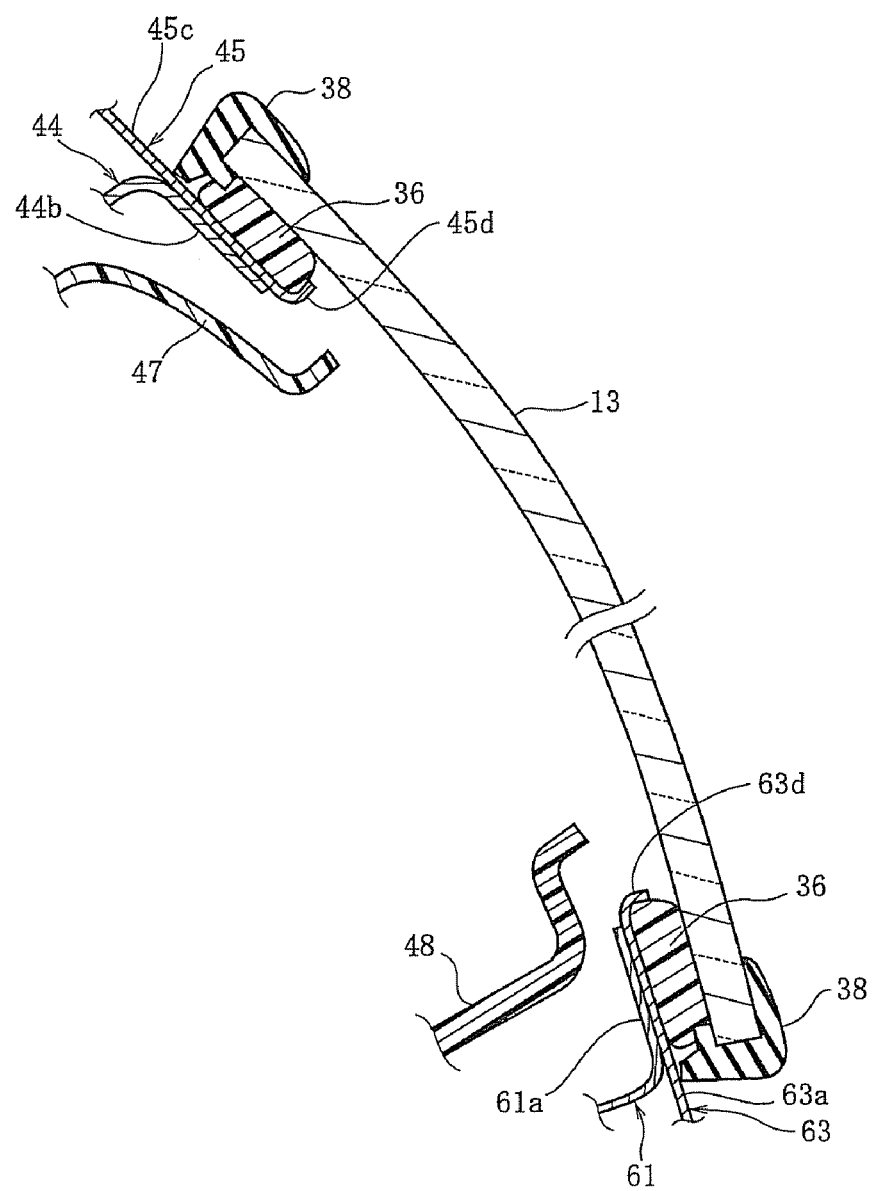
FIG. 7 is a sectional view taken along the line H-H of FIG. 2.

As shown in FIGS. 2, 5 and 6, the lower part of the front pillar 17 is joined to the side end part of a cowl inner panel 61 via a lower joint panel 62. Specifically, the lower part of the front pillar 17 is joined to the side end part of the cowl inner panel 61 via the lower joint panel 62 bent at about 90 degrees. The cowl inner panel 61 is provided along the lower edge of the windshield glass 13, and at the upper edge of the cowl inner panel 61, a cowl inside flange 61a that is parallel with the lower edge of the windshield glass 13 is formed integrally (FIGS. 2, 5 and 7). To the front surface of the cowl inner panel 61, a cowl outer panel 63 is joined (FIGS. 2 and 7). The cowl outer panel 63 is provided along the lower edge of the windshield glass 13, and at the upper edge of the cowl outer panel 63, a cowl outside flange 63a joined to the cowl inside flange 61a is formed integrally (FIGS. 2, 5 and 7). Also, the cowl outer panel 63 has a center cowl part 63b positioned in the center in the vehicle width direction and a pair of side cowl parts 63c joined to both the side edges of the center cowl part 63b. In this embodiment, the lower part of the inner front-side flange 31b is projectingly provided to the height of the lower joint panel 62, preferably to the center in the height direction of the lower joint panel 62 or over the whole region in the height direction thereof (FIG. 5). Also, in the lower part of the front pillar 17, a reinforcement 64 is sometimes provided in a state of being accommodated by the front pillar 17 (FIGS. 5 and 6). The inner front-side flange 31b is joined to the outer front-side flange 32b by laser welding 66, spot welding, arc welding, or the like welding process (FIG. 5). At the upper edge of the cowl outside flange 63a, a cowl fold part 63d projecting toward the inner surface of the windshield glass 13 is formed integrally (FIGS. 2 and 7). Also, reference numerals 47 and 48 in FIG. 7 denote a roof trim and an instrument panel, respectively.

On the other hand, it is assumed that when the Japanese male driver 12 of JM50 who sits on the driver's seat of the truck 10 and whose pupil interval is 66 mm looks at the direction of the front corner member 16 with his both eyes 12a and 12b, an object 18 on the outside of vehicle is present at a position at least 5 m distant from pupils 12c and 12d of the driver 12 on the sight line of the driver 12 directed to the front corner member 16 (FIGS. 9 and 10). When the width of the front corner member 16 and the width of the object 18 at the time when the driver 12 sitting on the driver's seat of the vehicle 10 looks at are taken as M (FIG. 1) and A (FIG. 9), respectively, and the width A is 155 mm, even if the front corner member 16 is present, the front corner member 16 has a width M such that the driver 12 can sight a portion of one third or more of width A of the object 18. In this embodiment, the object 18 on the outside of vehicle is a smallest person, that is, a Japanese seven-year-old child (a first-grade pupil in elementary school) singly going across a pedestrian crossing 21a on the right-hand side as viewed from the driver on the truck 10 at an intersection 22 of a travel road 19 on which the truck 10 runs and a crossing road 21 crossing the travel road 19 (FIGS. 9 and 10). The reason why the width of the pedestrian 18 is specified at 155 mm is that the smallest person among persons who go singly across a pedestrian crossing at an intersection etc. is thought to be a Japanese first-grade pupil in elementary school, that is, a Japanese seven-year-old child, the narrowest width of this Japanese seven-year-old child is the chest width (thickness) at the time when the child faces sideways with respect to the direction of sight line of the driver, and the chest thickness of the Japanese seven-year-old child is 155 mm on the average. Also, the reason why the pupil interval of the driver 12 of the truck 10 is specified at 66 mm is that when one hundred Japanese 18-year-old or older males capable of obtaining an ordinary driver's license or a large-size vehicle driver's license, who have been chosen at random, are lined up in order of height, the fiftieth Japanese male from the front has a pupil interval D of both eyes of 66 mm, and the Japanese male having an average pupil interval (Japanese male of JM50) among Japanese 18-year-old or older males is made the standard. Further, the reason why the distance from the pupils 12c and 12d of the driver 12 to the pedestrian 18 is specified at 5 m or longer is that the distance from the pupils 12c and 12d of the driver 12 of the vehicle 10 to the pedestrian 18 going across the pedestrian crossing 21a on the right-hand side of the crossing road 21 at the time when the vehicle 10 turns to the right from the travel road 19 to the crossing road 21 at the intersection 22 of the narrowest road having an opposite lane, that is, at the intersection 22 of a one-side on-lane road of oncoming traffic is about 5 m.

On the other hand, in this embodiment, the width M of the front corner member 16 at the time when the driver 12 sitting on the driver's seat of the truck 10 looks at is not wider than 72 mm, preferably wider than 58 mm and not wider than 72 mm. The width of the front corner member 16 at the time when the driver 12 sitting on the driver's seat looks at is an interval M (FIG. 1) between two parallel lines $S_1$ and $S_2$ (FIG. 1). These two parallel lines are determined as described below. The driver 12 looks straight at the front corner member 16 (FIG. 9), the front corner member 16 is cut by a substantially horizontal plane including a line segment connecting the pupils 12c and 12d of both the eyes 12a and 12b of the driver 12 (FIG. 1), and further a perpendicular line S (sight line direction, FIG. 9) perpendicular to the line segment is drawn from the middle point of the line segment connecting the pupils 12c and 12d of both the eyes 12a and 12b of the driver 12 toward the front corner member 16 in the substantially horizontal plane. At this time, the two parallel lines $S_1$ and $S_2$ parallel with this perpendicular line are drawn with the front corner member 16 being held therebetween. Although it is assumed that the driver 12 looks straight at the front corner member 16, FIG. 9 shows the pupil of the right eye as the standard in a simplified manner for ease of explanation. Also, in FIG. 9, a both eyes blind spot region means a region in which the pedestrian 18 cannot be sighted with both the eyes 12a and 12b of the driver 12, a left eye blind spot region means a region in which the pedestrian 18 cannot be sighted with the left eye 12a of the driver 12 though can be sighted with the right eye 12b thereof, and a right eye blind spot region means a region in which the pedestrian 18 cannot be sighted with the right eye 12b of the driver 12 though can be sighted with the left eye 12a thereof. In this embodiment, the front corner member is cut by a substantially horizontal plane including the line segment connecting the pupils of both the eyes of the driver. However, the front corner member may be cut by a plane including both the eyes of the driver and the pedestrian regardless of the horizontal plane or an inclined plane.

Figure 11:
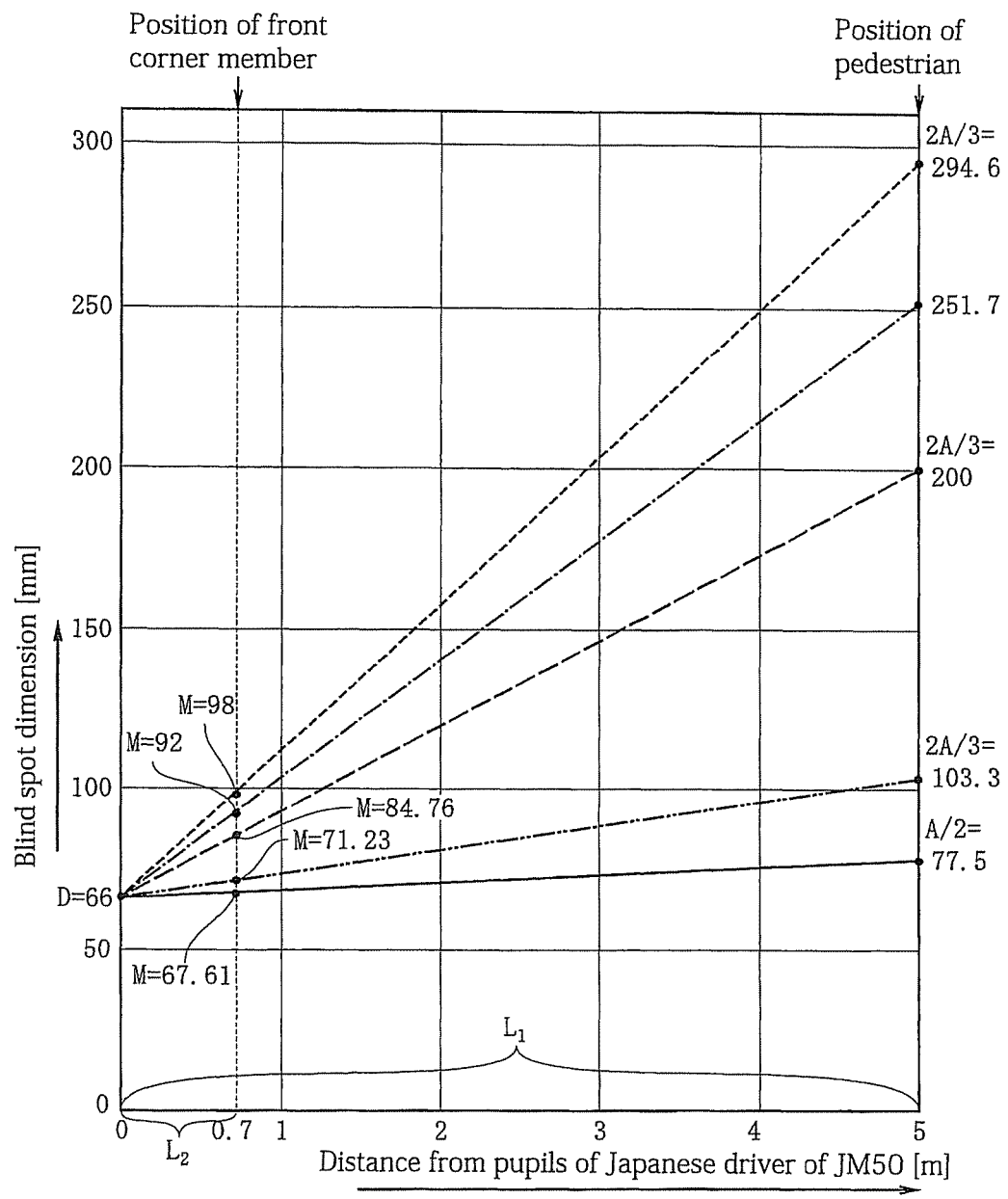
FIG. 11 is a diagram showing the maximum value of width M of a front corner member allowing a Japanese male driver of JM50 in accordance with a first embodiment to sight a one-third portion of width A and a half portion of width A of a seven-year-old child when the driver looks at a Japanese seven-year-old child 5 m distant from the driver, the maximum value of width M of the front corner member allowing the driver to sight a one-third portion of width A of a six-year-old child when the driver looks at a six-year-old child, and a width such that a Japanese six-year-old child is invisible because being blocked by the front corner member at the time when the width M of the conventional front corner member is 92 mm and 98 mm.

When the distance from the pupils 12c and 12d of the driver 12 to the pedestrian 18 on the outside of vehicle is taken as $L_1$, the distance from the pupils 12c and 12d of the driver 12 to the front corner member 16 is taken as $L_2$, the pupil interval is taken as D, and the width of the pedestrian 18 on the outside of vehicle is taken as A, the maximum value (72 mm) of the width M of the front corner member 16 can be determined from the following formula (1) (FIGS. 1, 9 and 11).

$$M=[[(2/3)\times A-D]/L_1]\times L_2+D \quad (1)$$

Substitution of $L_1$=5000 mm, $L_2$=700 mm, D=66 mm, and A=155 mm into Formula (1) yields
M=71.23.
Rounding-up of the figures below decimals gives
M=72 mm.

The reason why the distance $L_2$ from the pupils 12c and 12d of the driver 12 to the front corner member 16 is set at 700 mm is that a mean value is adopted because the distance $L_2$ differs depending on the vehicle type or the adjustment in the front and rear direction of the driver's seat, and the positional relationship for a cab-over-engine truck having a loadage of about 2 tons, that is, the distance $L_2$ from the pupils 12c and 12d of the driver 12 to the front corner member 16 is about 700 mm. Also, as shown in FIG. 9, the width M of the front corner member 16 and the distance $L_2$ from the pupils 12c and 12d of the driver 12 to the front corner member 16 are set so that the front corner member 16 is within the both eyes blind spot region of the driver 12. Also, since the front corner member 16 has the width M such that the driver 12 can sight the portion of one third or more of width A of the object 18, a portion less than two thirds of the width A of the pedestrian 18, for example, a half or a part of the pedestrian 18 need not be sighted by being blocked by the front corner member 16. Further, needless to say, in the case where the width of the pedestrian 18 exceeds 155 mm, the driver 12 can sight a portion exceeding one third of the width A of the object 18.

The operation of the truck 10 configured as described above is explained.

As shown in FIG. 1, the inner front-side flange 31b jointed to the outer front-side flange 32b does not project to the opposite side to the side edge of the windshield glass 13, that is, does not project toward the center in the width direction of the windshield glass 13, and also the pillar inner body 31a is substantially parallel with the sight line directed to the pillar inner body 31a of the driver 12 sitting on the driver's seat of the truck, so that the width of the front pillar 17 viewed from the driver 12 can be narrowed. Also, the front pillar 17 is formed into a tubular shape by the pillar inner body 31a, the pillar outer body 32a, the front lap part 33, and the rear lap part 34, so that a predetermined rigidity as the front pillar 17 can be secured. As the result, while the rigidity of the front pillar 17 is kept, the width of front visual field of the driver 12 can be widened, and also the width of the front pillar 17 viewed from the driver 12 can be narrowed. Also, since the pillar garnish 39 is in close contact with the pillar outer surface of the pillar inner body 31a, the pillar garnish 39 is substantially parallel with the sight line directed to the pillar garnish 39 of the driver 12. Thereby, the width M of the front corner member 16 including the front pillar 17, the door frame 14d, the glass frame 14e, the glass run 14f, and the pillar garnish 39 as viewed from the driver is narrowed.

On the other hand, as shown in FIG. 10, when the truck 10 runs on the one-side on-lane road of oncoming traffic, and turns to the right at the intersection 22, the truck 10 stops and waits at the intersection 22 until a car going straight in the opposite lane of the travel road 19 passes through. After the car in the opposite lane has passed through, the driver 12 of the truck 10 looks at the state of the pedestrian crossing 21a on the right-hand side on the crossing road 21 intersecting the travel road 19 of the truck 10 and checks whether or not the pedestrian 18 is going across the pedestrian crossing 21a. At this time, when the driver 12 is taken as a Japanese male of JM50, the distance $L_1$ from the pupils 12c and 12d of the driver 12 to the pedestrian 18 on the outside of vehicle on the front slantwise at the right on the crossing road 21 is taken as 5 m, and the width A of the pedestrian 18 is taken as 155 mm, which is the mean value of the chest thicknesses A of Japanese seven-year-old children, the Japanese male drivers 12 of JM50, that is, the drivers 12 of a half of all Japanese 18-year-old or older males can sight a portion of one third or more of width A of the pedestrian 18 even if the front corner member 16 is present (FIG. 9). Specifically, since the pedestrian 18 is jutting out from the both eyes blind spot region of the driver 12 to the right eye blind spot region thereof, the driver 12 can sight the portion of one third or more of width A of the pedestrian 18 with his left eye 12a. An experiment has revealed that if the driver 12 can sight the portion of one third or more of width A of the pedestrian 18, he can recognize the presence of the pedestrian 18 on the far side of the front corner member 16. Also, since the pupil intervals of the 18-year-old or older Japanese have no large difference, if the Japanese male driver 12 of JM50 can sight the portion of one third or more of width A of the pedestrian 18, most of the Japanese 18-year-old or older drivers 12 can surely sight the pedestrian 18.

Figure 12:
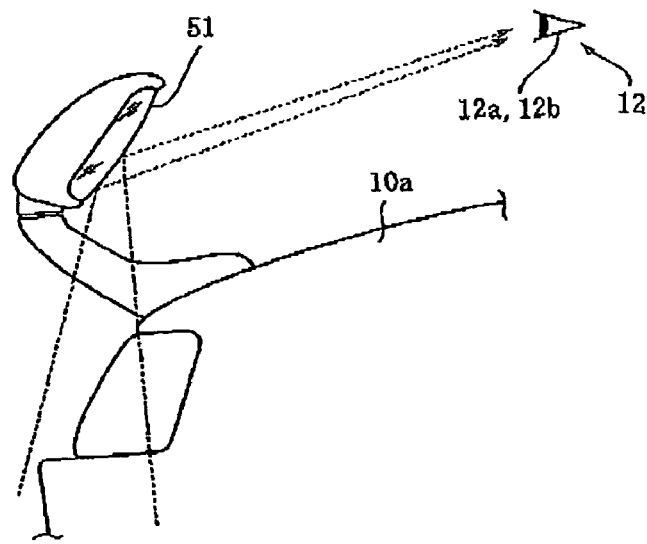
FIG. 12 is a side view of an essential portion including a special mirror of a cab-behind-engine recreational vehicle having a high vehicle height.

On the other hand, as shown in FIG. 12, it is known that on a cab-behind-engine recreational vehicle having a high vehicle height, a special mirror 51 is mounted on the front upper surface of a left-side front fender 10a (for example, refer to Japanese Unexamined Patent Application Publication No. 8-216788). This special mirror 51 is called a "just-front just-left mirror", and is used to sight the blind spot of the driver 12 in the range from just under the front of the recreational vehicle etc. to just under the side thereof. When the visual field of this special mirror 51 is evaluated, as an object, a columnar body having a diameter corresponding to the width of shoulders of a six-year-old child and a height corresponding to the height thereof, that is, a columnar body 28 (FIG. 9) having a diameter of 300 mm and a height of 1 m is used for evaluation. This columnar body 28 is taken as a pedestrian, the pupil interval D of the driver 12 is taken as 58 mm, which is the pupil interval of a Japanese female of JF5 having a relatively narrow pupil interval among the Japanese 18-year-old or older females, and "⅔" in Formula (1) is taken as "x". That is to say, x is determined by substituting M=72 mm, $L_1$=5000 mm, $L_2$=700 mm, D=58 mm, and A=300 mm into Formula (1), by which x=0.527 is obtained. As the result, a portion of a pedestrian 28 capable of being sighted is (1−0.527)×300=142 mm. Therefore, the Japanese female driver 12 of JF5, that is, almost all of the Japanese drivers can sight a portion of about a half (47.3%) of the pedestrian 28. As the result, if the width M of the front corner member 16 is 72 mm, when the width (chest thickness) of the pedestrian 10 is 155 mm, the Japanese male driver of JM50 can sight a one-third portion of width A of the pedestrian, and when the diameter (width of shoulders) of the pedestrian is 300 mm, even the Japanese female driver of JF5 having a narrow pupil interval can sight a portion of a half of width A of the pedestrian. Therefore, the driver 12 of the truck 10 need not move his/her upper body to the right or left to sight the far side of the front corner member 16. The driver 12 can surely sight the pedestrian 18, 28 on the pedestrian crossing 21a by looking straight at the direction of the front corner member 16 merely by moving his/her head, and also the fatigue of the driver 12 can be lessened. When the driver 12 judges that no pedestrian 18 is present on the pedestrian crossing 21a, he/she turns to the right quickly at the intersection 22.

On the other hand, by decreasing the width of the front corner member 16 as viewed by the driver 12, both side parts of the windshield glass 13 are expanded. The expanded both side parts of the windshield glass 13 can be wiped off by a wiper, and the dimness of these parts can be removed surely by a defroster. As the result, the noticeability on the front and slantwise front of the driver 12 through the windshield glass can be enhanced further. Also, when the pillar garnish 39 is assembled to the front pillar 17, if the locking piece 39a of the pillar garnish 39 is locked to the pillar fold part 32d, the manpower for assembling the pillar garnish 39 to the front pillar 17 can be reduced, and also a part such as a clip need not be used (FIG. 1). Also, since the locking piece 39a of the pillar garnish 39 is locked to the pillar fold part 32d positioned on the bonding part side of the windshield glass 13 from the extension line of the pillar inner body 31a, which is the direction of sight line of the driver 12, the visual field on the front and slantwise front of the driver 12 through the windshield glass 13 is not hindered, and the front pillar 17 is covered by the pillar garnish 39, so that the appearance of the peripheral edge of the front pillar 17 can be improved. Further, if the pillar garnish 39 is bonded to the pillar inner body 31a with the garnish adhesive 39c, a phenomenon that the pillar garnish 39 floats slightly from the pillar inner body 31a does not occur. Therefore, even if the truck 10 vibrates, the production of noise between the pillar garnish 39 and the pillar inner body 31a can be prevented. Also, since the pillar garnish 39 is in close contact with the pillar inner body 31a, the width M as the front corner member 16 can be kept in a narrow state.

On the other hand, the windshield glass 13 is bonded to the front pillar 17, the roof panel 45, and the cowl outer panel 63 by pressing the windshield glass 13 onto the outer front-side flange 32b, the roof front-side flange 45c, and the cowl outside flange 63a with the glass adhesive 36 being held between the inner surface at the peripheral edge of the windshield glass 13 and the pillar outer surface of the outer front-side flange 32b, the outer surface of the roof front-side flange 45c, and the outer surface of the cowl outside flange 63a (FIGS. 1 and 7). At this time, the glass adhesive 36 deforms and tends to jut out of the flanges 32b, 45c and 63a. However, the pillar fold part 32d, the roof fold part 45d, and the cowl fold part 63d prevent the glass adhesive 36 from jutting out of the end edges of the flanges 32b, 45c and 63a. As the result, the appearance of the peripheral edge of the windshield glass 13 can be prevented from being marred. Also, since the outer front-side flange 32b, the roof front-side flange 45c, and the cowl outside flange 63a are connectingly provided, the rigidity of the flanges 32b, 45c and 63a can be enhanced, and also the windshield glass 13 can be bonded to the flanges 32b, 45c and 63a rapidly. As the result, the manpower of work for bonding the windshield glass 13 can be reduced.

Also, since the upper part of the pillar inner panel 31 is projected to the upside without forming a notch in the pillar inner panel 31, the upper joint panel 43, the side inner panel 46, or the header inner panel 44, without the occurrence of stress concentration at the joint part of the upper part of the front pillar 17, the upper part of the pillar inner panel 31 can be joined to the upper joint panel 43, and the upper end part of the pillar inner panel 31 can be joined to the front end part of the side inner panel 46 (FIGS. 2 and 3). As the result, even if the width M (FIG. 1) of the front pillar 17 is decreased, the joint strength of the upper part of the front pillar 17 can be improved. Specifically, since the upper part of the pillar inner body 31a is projected into the plane on which the side end part of the header inner panel 44 is extended, and the upper part of the pillar inner body 31a is joined to the lower joint part 43c of the upper joint panel 43, the joint strength between the upper part of the front pillar 17 and the upper joint panel 43 can be improved, and also the joint strength between the tubular front pillar 17 and the substantially tubular roof header member 41 can be enhanced. Also, since the upper end part of the pillar inner body 31a is projected so as to lap on the front end part of the side inner panel 46, and the upper end part of the pillar inner body 31a is joined to the front end part of the side inner panel 46, the joint strength between the upper part of the front pillar 17 and the front end part of the side inner panel 46 can be improved, and thereby the joint strength between the tubular front pillar 17 and the tubular roof side member 42 can be enhanced. Further, since the upper part of the inner front-side flange 31b is projected into the plane on which the side end part of the header inner panel 44 is extended, and the upper end part of the inner front-side flange 31b is projected to a position of lapping on the front end part of the side inner panel 46, the upper part of the inner front-side flange 31b is formed substantially into an inverse L shape having high rigidity together with the upper part of the pillar inner body 31a. As the result, even if the width M (FIG. 1) of the front pillar 17 is decreased, the joint strength of the front pillar 17 can be improved.

On the other hand, since the cowl inner panel 61 is provided along the lower edge of the windshield glass 13, and the lower part of the inner front-side flange 31b that extends along the inner surface of the windshield glass 13 and toward the side edge of the glass 13 is projected to the height of the lower joint panel 62, the inner front-side flange 31b having high rigidity is projected to the height of the lower joint panel 62, which is a strength member for joining the cowl inner panel 61 to the pillar inner panel 31. Thereby, the cross-sectional area of the lower part of the front pillar 17 can be increased, so that the joint strength of the lower part of the front pillar 17 can be increased (FIGS. 5 and 6). As the result, even if the width M (FIG. 1) of the front pillar 17 is decreased, the joint strength of the lower part of the front pillar 17 can be improved. In this case, if the inner front-side flange 31b is provided to the center or in the height direction or in the whole region in the height direction of the lower joint panel 62, the joint strength of the lower part of the front pillar 17 can be enhanced further.

In the above-described first embodiment, the front corner member 16 is, formed so as to have the width M such that the driver 12 can sight the portion of one third or more of width A of the pedestrian 18 on the outside of vehicle. However, it is preferable that the front corner member 16 be formed so as to have the width M such that the driver 12 can sight the portion of a half or more of width A of the pedestrian 18 on the outside of vehicle. In this case, the width of the front corner member 16 at the time when the driver 12 sitting on the driver's seat looks at the front corner member 16 is not wider than 68 mm, preferably wider than 58 mm and not wider than 68 mm. The maximum value (68 mm) of the width M of the front corner member 16 is determined from the following formula (2) (FIGS. 1, 9 and 11)

DETAILED DESCRIPTION OF THE INVENTION $$M=[[(1/2) \times A-D]/L_1] \times L_2+D \quad (2)$$

Substitution of $L_1$=5000 mm, $L_2$=700 mm, D=66 mm, and A=155 mm into Formula (2) yields
M=67.61.
Rounding-up of the figures below decimals gives
M=68 mm.

If the configuration is made as described above, the Japanese male driver 12 of JM50, that is, the drivers 12 of a half of all Japanese 18-year-old or older males can sight a portion of a half or more of width A of the pedestrian 18. Also, the columnar body 28 shown in FIG. 9 is taken as a pedestrian, the pupil interval D of the driver 12 is taken as 58 mm, which is the pupil interval of a Japanese female of JF5, and "½" in Formula (2) is taken as "y". That is to say, y is determined by substituting M=68 mm, $L_1$=5000 mm, $L_2$=700 mm, D=58 mm, and A=300 mm into Formula (2), by which y=0.431 is obtained. As the result, a portion of a pedestrian 28 capable of being sighted is (1−0.431)×300=171 mm. Therefore, the Japanese female driver 12 of JF5 that is, almost all of the Japanese drivers can sight a portion of a half or more (about 56%) of the pedestrian 28. Thereupon, the noticeability of the pedestrian 18, 28 can be improved as compared with the first embodiment.

On the other hand, in the first embodiment, explanation has been given under the severe condition that the pedestrian 18 is taken as a seven-year-old child, and the width of the pedestrian 18 is taken as the chest thickness 155 in a very rare case where the pedestrian 18 faces to the direction perpendicular to the direction of sight line of the driver 12. Actually, however, the pedestrian 18 faces to various directions. Also, considering the case where the pedestrian 18 carries a knapsack on his/her back, if the Japanese male driver of JM50 having a pupil interval of 66 mm can sight a one-third portion of chest thickness A of 155 mm of the pedestrian 18, even the driver 12 having a pupil interval of 66 mm or smaller can fully recognize the pedestrian 18, and most of the drivers 12 can sight the pedestrian 18.

Also, even if the pedestrian 28 is a six-year-old child having a width of shoulders (diameter) of 300 mm, if the driver 12 can sight a one-third portion of the width of shoulders (A=300 mm) of the pedestrian 28, the driver 12 can sight an actual child. The width M of the front corner member 16 that allows the Japanese male driver 12 of JM50 to sight the one-third portion of the width of shoulders (A=300 mm) of the pedestrian 28 can be determined from the following formula (1).

$$M=[[(2/3) \times A-D]/L_1] \times L_2+D \quad (1)$$

Substitution of $L_1$=5000 mm, $L_2$=700 mm, D=66 mm, and A=300 mm into Formula (1) yields
M=84.76.
Rounding-up of the figures below decimals gives
M=85 mm.

If the width M of the front corner member 16 is not wider than 85 mm, preferably wider than 58 mm and not wider than 85 mm, an actual child, who is the object 28 having a diameter of 300 mm, can be sighted.

Figure 13:
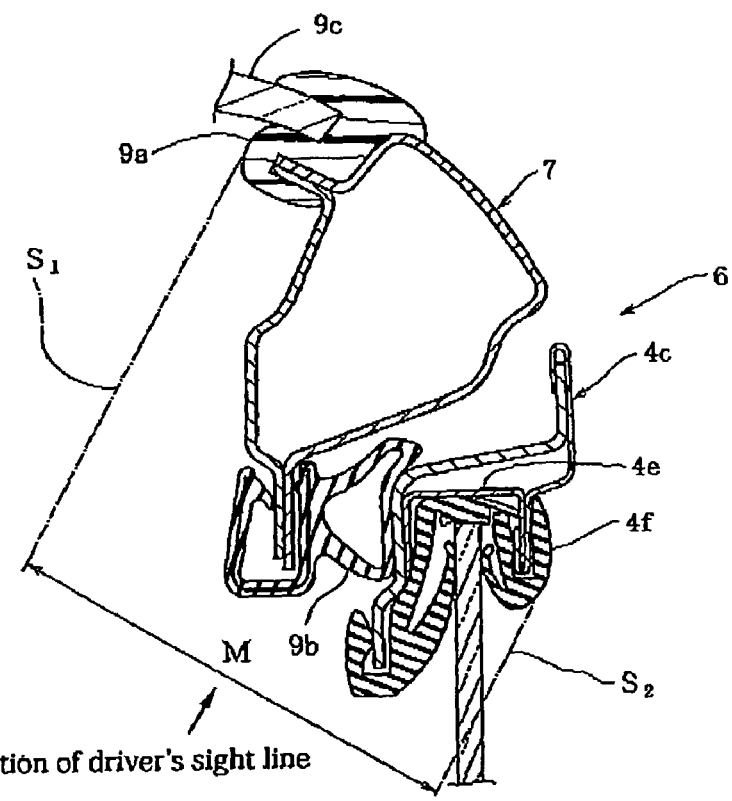
FIG. 13 is a sectional view corresponding to FIG. 1, showing a front corner member of conventional example 1.

On the other hand, as shown in FIG. 13, a conventional front corner member 6 is formed by a first weather strip 9a, a front pillar 7, a second weather strip 9b, a door frame 4c, a glass frame 4e, and a glass run 4f. The width M of this conventional front corner member 6 of a small truck, that is, the width M from the first weather strip 9a to the glass run 4f was measured, and measurement values of 92 to 98 mm were obtained. Substitution of M=92 mm, $L_1$=5000 mm, $L_2$=700 mm, and D=66 mm into Formula (1) yields A=377.6, and 2A/3 is equal to 251.7 mm. Also, substitution of M=98 mm, $L_1$=5000 mm, $L_2$=700 mm, and D=66 mm into Formula (1) yields A=441.9, and 2A/3 is equal to 294.6 mm. Therefore, if the object on the outside of vehicle is a six-year-old child having a width of shoulders (diameter) of 300 mm, the driver cannot sight a portion ranging from 83.9% [(251.7/300)×100] to 99.5% [(294.6/300)×100] by being blocked by the front corner member 6. The front corner member in accordance with the present invention can improve the visual field remarkably as compared with the conventional front corner member 6. In FIG. 13, symbol 9c denotes a windshield glass.

Second Embodiment

Figure 14:
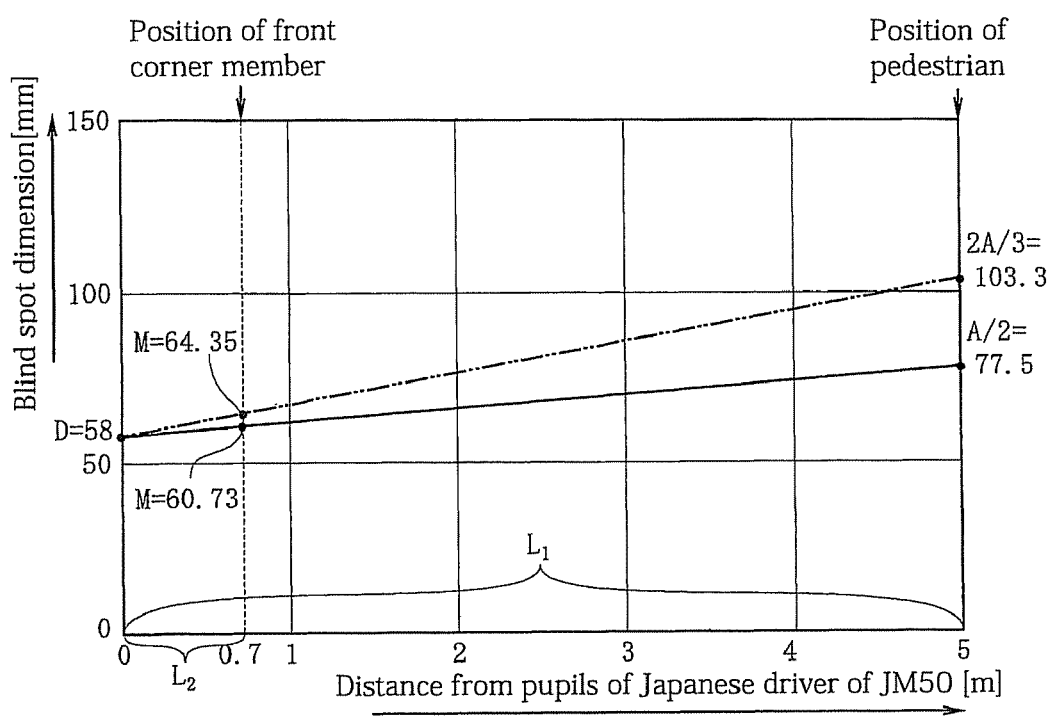
FIG. 14 is a diagram showing the maximum value of width M of a front corner member allowing Japanese female driver of JF5 in accordance with a second embodiment to sight a one-third portion of width A and a half portion of width A of a seven-year-old child when the driver looks at a Japanese seven-year-old child 5 m distant from the driver.

FIG. 14 shows a second embodiment of the present invention. For convenience, FIGS. 1, 2, and 7 to 10 used for the explanation of the above-described first embodiment are also used for the explanation of the second embodiment.

In this embodiment, it is assumed that when the Japanese female driver 12 of JF5 who sits on the driver's seat of the vehicle 10 and whose pupil interval is 58 mm looks at the direction of the front corner member 16 with her both eyes 12a and 12b, the pedestrian 18 on the outside of vehicle is present at a position at least 5 m distant from the pupils 12c and 12d of the driver 12 on the sight line of the driver 12 directed to the front corner member 16 (FIGS. 9 and 10). When the width of the front corner member 16 and the width of the pedestrian 18 at the time when the driver 12 sitting on the driver's seat of the vehicle 10 looks at are taken as M (FIG. 1) and A (FIG. 9), respectively, and the width A is 155 mm, even if the front corner member 16 is present, the front corner member 16 has a width M such that the driver 12 can sight a portion of one third or more of width A of the pedestrian 18. The reason why the pupil interval of the driver 12 of the vehicle 10 is specified at 58 mm is that when one hundred Japanese 18-year-old or older females capable of obtaining an ordinary driver's license or a large-size vehicle driver's license, who have been chosen at random, are lined up in order of height, the fifth Japanese female from the front has a pupil interval D of both eyes of 58 mm, and the Japanese females generally have a smaller pupil interval than the Japanese males, whereby the Japanese female having a relatively small pupil interval (Japanese female of JF5) among the Japanese 18-year-old or older females is made the standard. Also, the reason why the width of the pedestrian 18 is specified at 155 mm is that the smallest person among persons who go singly across a pedestrian crossing at an intersection etc. is thought to be a Japanese first-grade pupil in elementary school, that is, a Japanese seven-year-old child, the narrowest width of this Japanese seven-year-old child is the chest thickness at the time when the child faces sideways with respect to the direction of sight line of the driver, and the chest thickness of the Japanese seven-year-old child is 155 mm on the average. Further, the reason why the distance from the pupils $12c$ and $12d$ of the driver 12 to the pedestrian 18 is specified at 5 m or longer is that the distance from the pupils $12c$ and $12d$ of the driver 12 of the vehicle 10 to the pedestrian 18 going across the pedestrian crossing $21a$ on the right-hand side of the crossing road 21 at the time when the vehicle 10 turns to the right from the travel road 19 to the crossing road 21 at the intersection 22 of the narrowest road having an opposite lane, that is, at the intersection 22 of a one-side on-lane road of oncoming traffic is about 5 m.

On the other hand, in this embodiment, the width of the front corner member 16 at the time when the driver 12 sitting on the driver's seat of the truck 10 looks at is not wider than 65 mm, preferably wider than 58 mm and not wider than 65 mm. The width of the front corner member 16 at the time when the driver 12 sitting on the driver's seat looks at is the width defined in the above-described first embodiment.

The maximum value (65 mm) of the width M of the front corner member 16 can be determined from the following formula (1) (FIGS. 1, 9 and 14).

$$M=[[(2/3) \times A - D]/L_1] \times L_2 + D \tag{1}$$

Substitution of $L_1$=5000 mm, $L_2$=700 mm, D=58 mm, and A=155 mm into Formula (1) yields

M=64.35.

Rounding-up of the figures below decimals gives

M=65 mm.

The fact that the distance $L_2$ from the pupils $12c$ and $12d$ of the driver 12 to the front corner member 16 is set at 700 mm is based on the same reason as that described in the above-described first embodiment. The configurations other than the above are the same as those in the first embodiment.

The operation of the truck 10 configured as described above is explained.

As shown in FIG. 10, when the truck 10 runs on the one-side on-lane road of oncoming traffic, and turns to the right at the intersection 22, the truck 10 stops and waits at the intersection 22 until a car going straight in the opposite lane of the travel road 19 passes through. After the car in the opposite lane has passed through, the driver 12 of the truck 10 looks at the state of the pedestrian crossing $21a$ on the right-hand side on the crossing road 21 intersecting the travel road 19 of the truck 10 and checks whether or not the pedestrian 18 is going across the pedestrian crossing $21a$. At this time, when the driver 12 is taken as a Japanese female of JF5, the distance $L_1$ from the pupils $12c$ and $12d$ of the driver 12 to the pedestrian 18 on the outside of vehicle on the front slantwise at the right on the crossing road 21 is taken as 5 m, and the width A of the pedestrian 18 is taken as 155 mm, which is the mean value of the chest thicknesses A of Japanese seven-year-old children, the Japanese female drivers 12 of JF5, that is, most of the 18-year-old or older Japanese drivers 12 can sight a portion of one third or more of width A of the pedestrian 18 even if the front corner member 16 is present (FIG. 9). Specifically, since the pedestrian 18 is jutting out from the both eyes blind spot region of the driver 12 to the right eye blind spot region thereof, the driver 12 can sight the portion of one third or more of width A of the pedestrian 18 with his/her left eye $12a$. Also, since the pupil intervals of the 18-year-old or older Japanese have no large difference, if the Japanese female driver 12 of JF5 can sight the portion of one third or more of width A of the pedestrian 18, almost all of the Japanese 18-year-old or older drivers 12 can surely sight the pedestrian 18. Therefore, the driver 12 of the truck 10 need not move his/her upper body to the right or left to sight the far side of the front corner member 16. The driver 12 can surely sight the pedestrian 18 on the pedestrian crossing $21a$ by looking straight at the direction of the front corner member 16 merely by moving his/her head, and also the fatigue of the driver 12 can be lessened. The operations other than the above-described one are the same as those in the first embodiment, so that repeated explanation is omitted.

In the above-described second embodiment, the front corner member 16 is formed so as to have the width M such that the driver 12 can sight the portion of one third or more of width A of the pedestrian 18 on the outside of vehicle. However, it is preferable that the front corner member 16 be formed so as to have the width M such that the driver 12 can sight the portion of a half or more of width A of the pedestrian 18 on the outside of vehicle. In this case, the width of the front corner member 16 at the time when the driver 12 sitting on the driver's seat looks at the front corner member 16 is not wider than 61 mm, preferably wider than 58 mm and not wider than 61 mm. The maximum value (61 mm) of the width M of the front corner member 16 is determined from the following formula (2) (FIGS. 1, 9 and 14).

$$M=[[(1/2) \times A - D]/L_1] \times L_2 + D \tag{2}$$

Substitution of $L_1$=5000 mm, $L_2$=700 mm, D=58 mm, and A=155 mm into Formula (2) yields

M=60.73.

Rounding-up of the figures below decimals gives

M=61 mm.

If the configuration is made as described above, the Japanese female driver 12 of JF5, that is, almost all of the Japanese 18-year-old or older drivers 12 can sight a portion of a half or more of width A of the pedestrian 18, so that the noticeability of the pedestrian 18 can be improved as compared with the above-described second embodiment.

Also, in the above-described first and second embodiments, a truck has been cited as the vehicle. However, a passenger car or a bus may also be cited.

Also, even if the driver of vehicle is a foreigner, the pupil interval of the foreigner is almost the same as that of the Japanese driver. Even if the object is a foreign seven-year-old child, the chest thickness of the foreign seven-year-old child is almost the same as that of the Japanese seven-year-old child, and even if the object is a foreign six-year-old child, the width of shoulders of the foreign seven-year-old child is almost the same as that of the Japanese six-year-old child. Therefore, the present invention can be applied not only in the Japanese country but also in foreign countries and can achieve an equivalent effect.

Also, in the above-described first and second embodiments, a vehicle having the driver's seat on the right-hand side, that is, what is called a right-hand drive vehicle has been cited as the vehicle. However, the present invention can also be applied to what is called a left-hand drive vehicle. In this case, the present invention is applied to the front corner member on the driver's seat side, that is, on the left-hand side.

Figure 15:
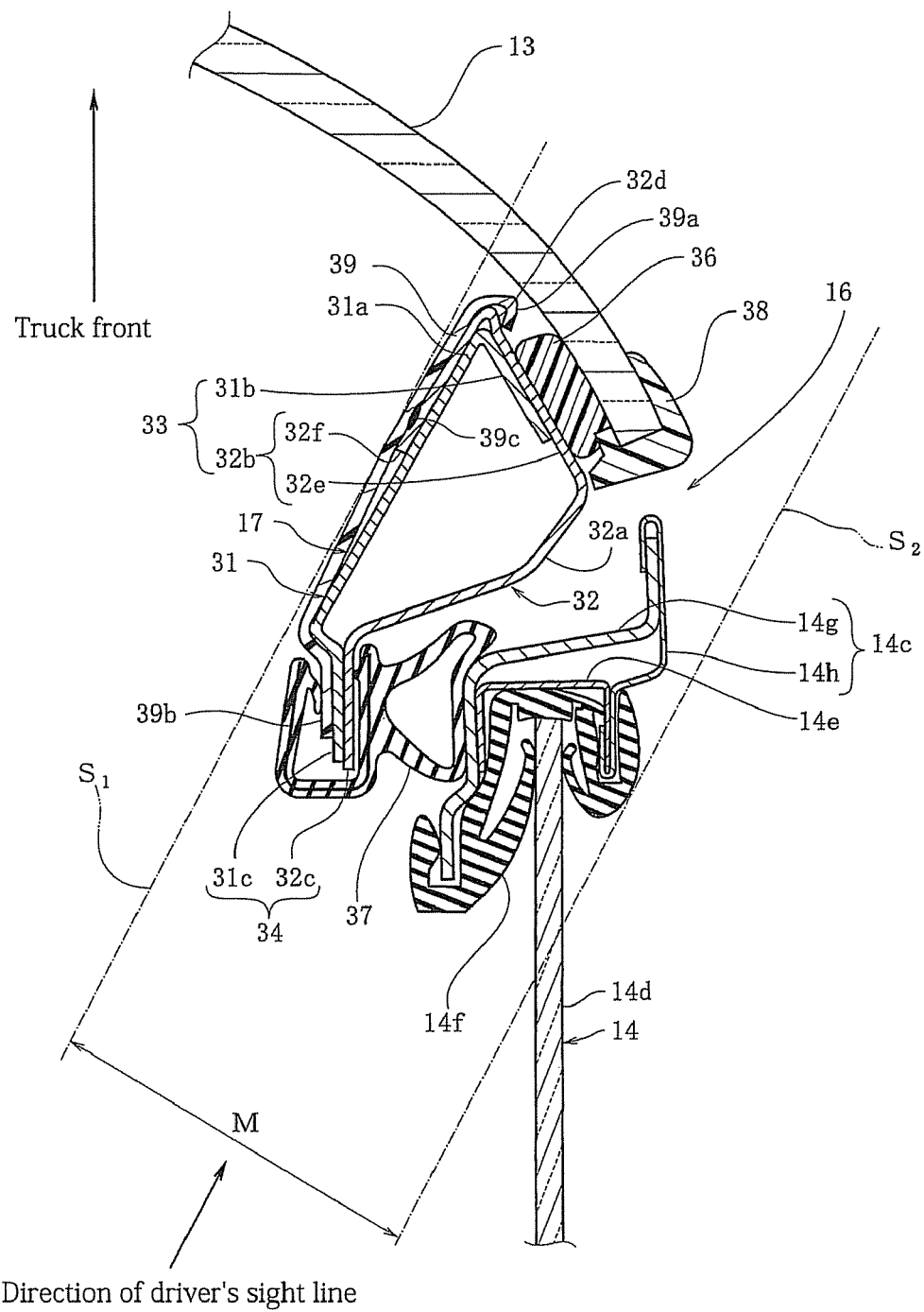
FIG. 15 is a sectional view corresponding to FIG. 1, showing a front structure of a truck in accordance with a third embodiment of the present invention.

Also, in the above-described first and second embodiments, the inner surface at the side edge of the windshield glass is attached to the outer surface of the front lap part. As shown in FIG. 15, the configuration may be such that the outer front-side flange $32b$ of the pillar outer panel 32 has a first joint side $32e$ that is formed at the front edge of the pillar outer body $32a$ integrally with the pillar outer body $32a$ and extends along the windshield glass 13 and a second joint side $32f$ that is provided at the end edge of the first joint side $32e$ via the pillar fold part $32d$, so that the second joint side $32f$ is brought into contact with or joined to the pillar inner body 31*a* provided along the direction of sight line of the driver of the pillar inner panel 31. In this case as well, the front lap part 33 does not project to the opposite side to the side edge of the windshield glass 13, so that the noticeability on the far side of the front corner member 16 can be improved.

Figure 16:
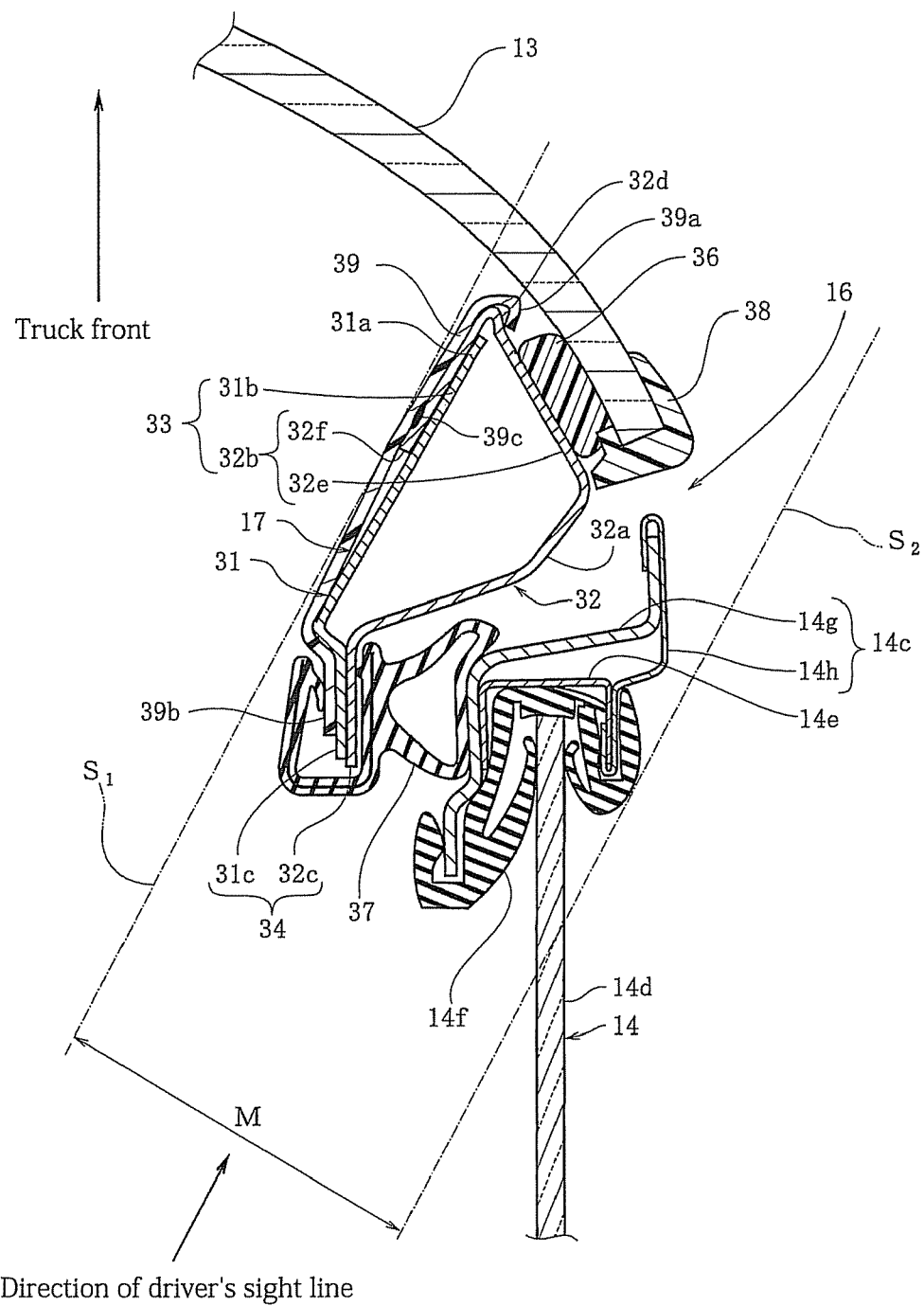
FIG. 16 is a sectional view corresponding to FIG. 1, showing a front structure of a truck in accordance with a fourth embodiment of the present invention.

Also, the configuration may be such that the inner front-side flange 31*b* shown in FIG. 15 is not used, and as shown in FIG. 16, the pillar inner body 31*a* is also used as the inner front-side flange 31*b*, by which the front lap part 33 may be formed by the inner front-side flange 31*b* and the second joint side 32*f* of the outer front-side flange 32*b*.

Figure 17:
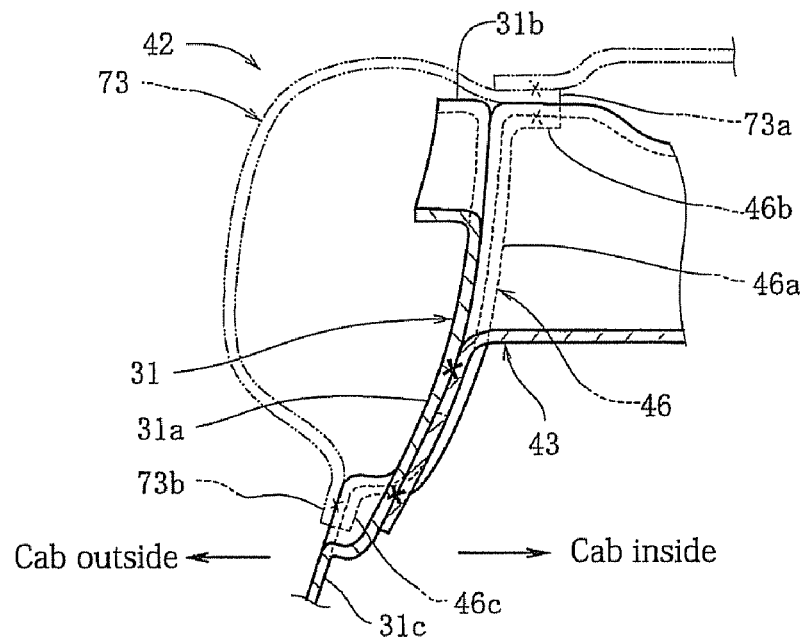
FIG. 17 is a sectional view corresponding to FIG. 4, showing a fifth embodiment of the present invention.

Also, in the above-described first embodiment, the side edge of the side roof part of the roof panel has been cited as the roof-forming member joined to the side inner panel. However, as shown in FIG. 17, the roof-forming member joined to the side inner panel 46 may be a side outer panel 73. In this case, the side lower-side flange 46*c* of the side inner panel 46 and a side lower-side flange 73*b* of the side outer panel 73 are joined to each other, and the side upper-side flange 46*b* of the side inner panel 46 and a side upper-side flange 73*a* of the side outer panel 73 are joined to each other together with the side edge of the roof panel 45, by which the roof side member 42 is formed into a tubular shape.

Figure 18:
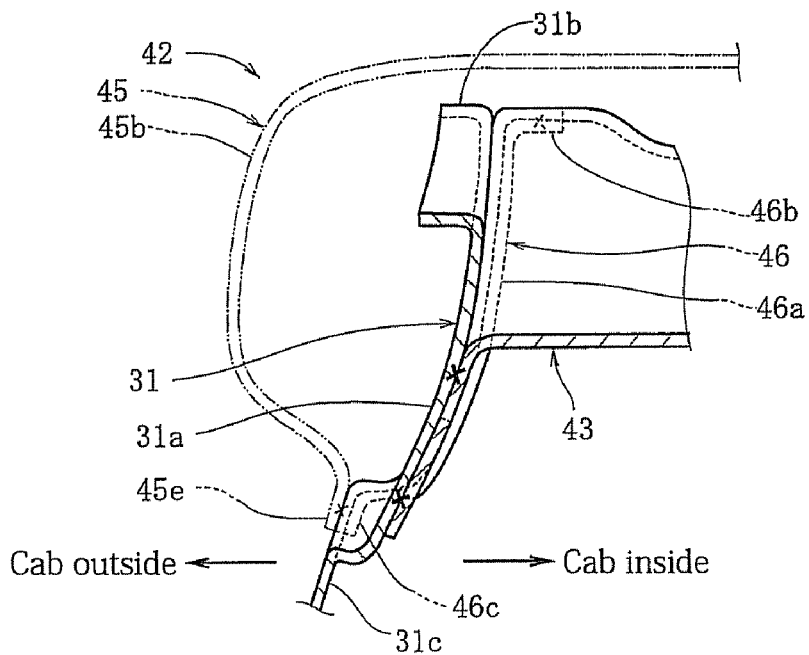
FIG. 18 is a sectional view corresponding to FIG. 4, showing a sixth embodiment of the present invention.

Also, in the above-described first embodiment, the side inner panel and the side edge of the roof panel are joined to each other to form the roof side member into a tubular shape. However, as shown in FIG. 18, the side lower-side flange 46*c* of the side inner panel 46 and the roof lower-side flange 45*e* of the roof panel 45 are joined to each other, and a predetermined gap is formed between the side upper-side flange 46*b* of the side inner panel 46 and the roof panel 45, by which the transverse cross section of the roof side member 42 may be formed into a substantially tubular shape (substantially into a C shape).

Figure 19:
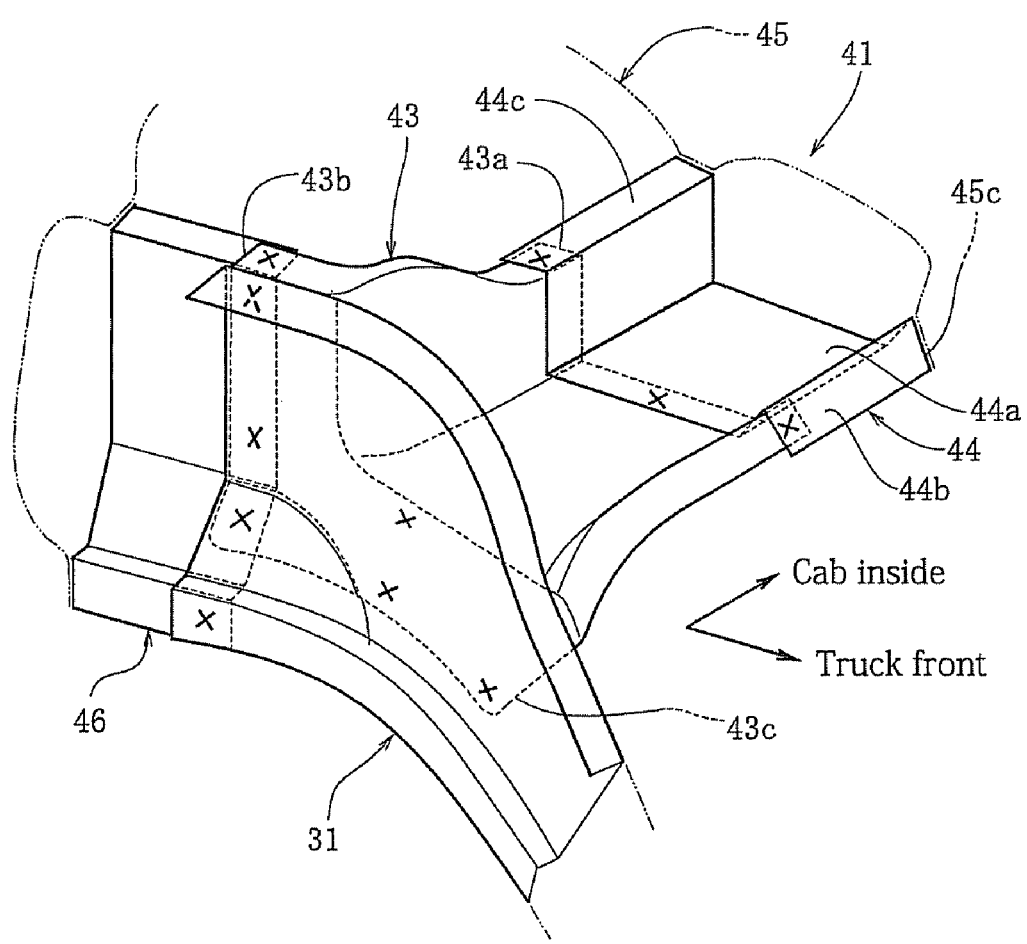
FIG. 19 is a sectional view corresponding to FIG. 3, showing a seventh embodiment of the present invention.
Figure 20:
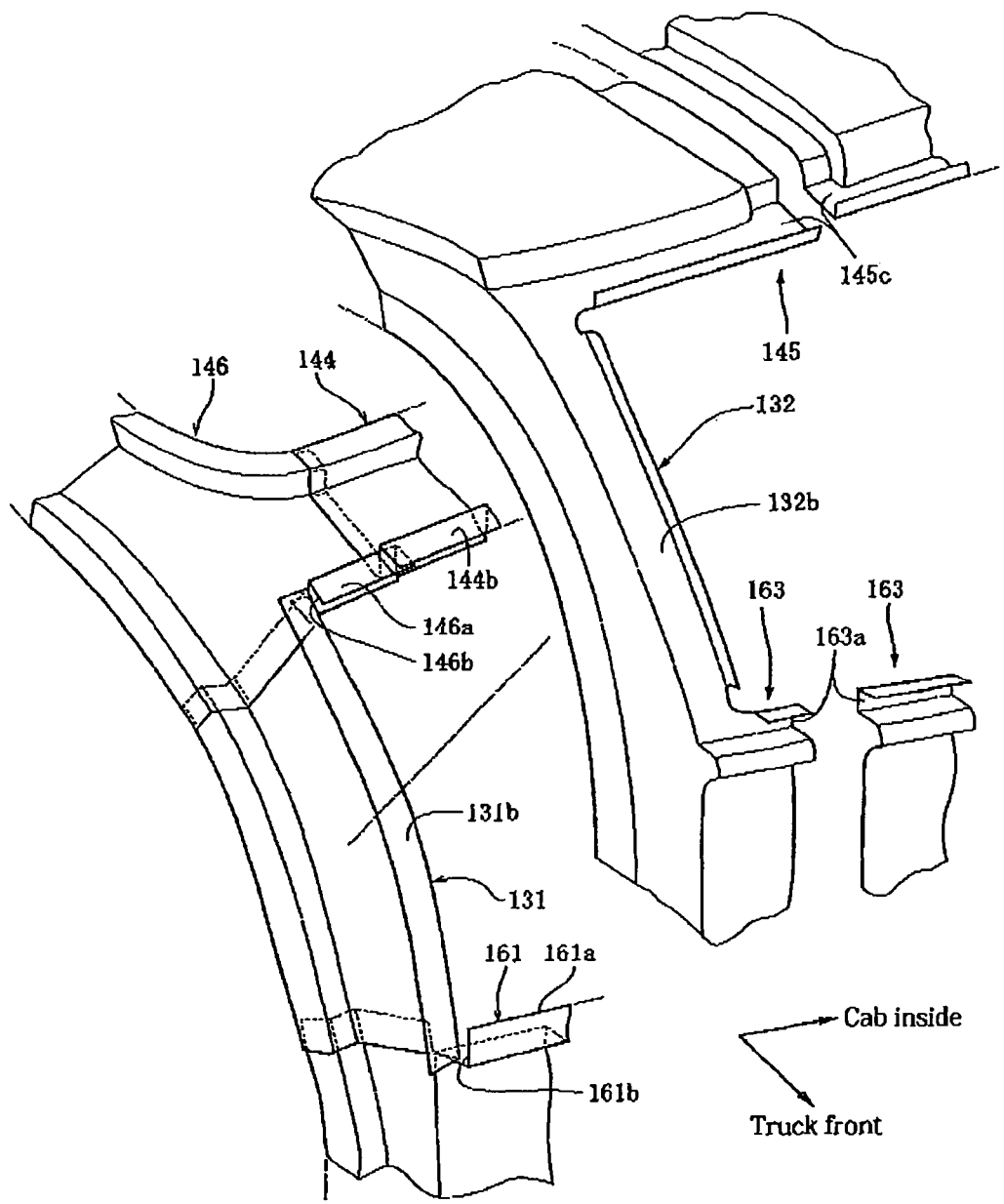
FIG. 20 is an exploded perspective view corresponding to FIG. 2, showing conventional example 2.
Figure 21:
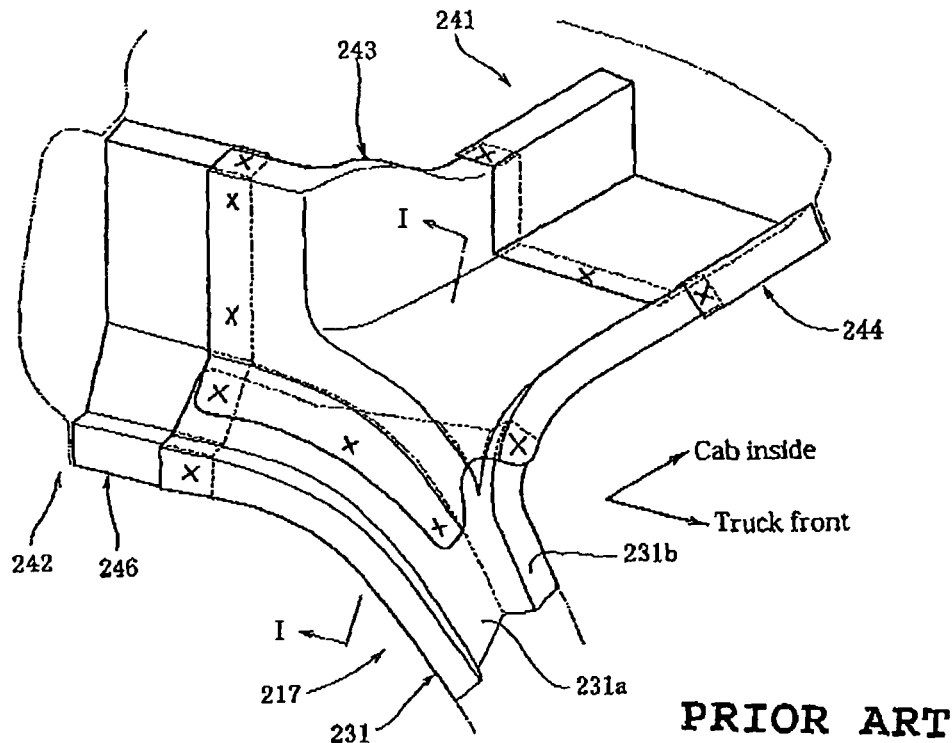
FIG. 21 is a perspective view corresponding to FIG. 3, showing conventional example 3.
Figure 22:
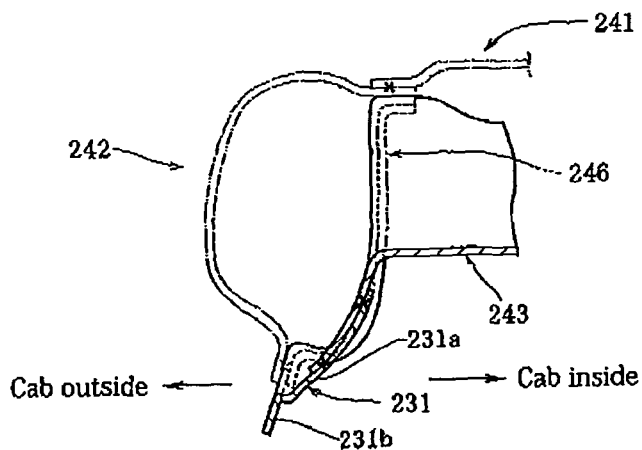
FIG. 22 is a sectional view taken along the line I-I of FIG. 21.
Figure 23:
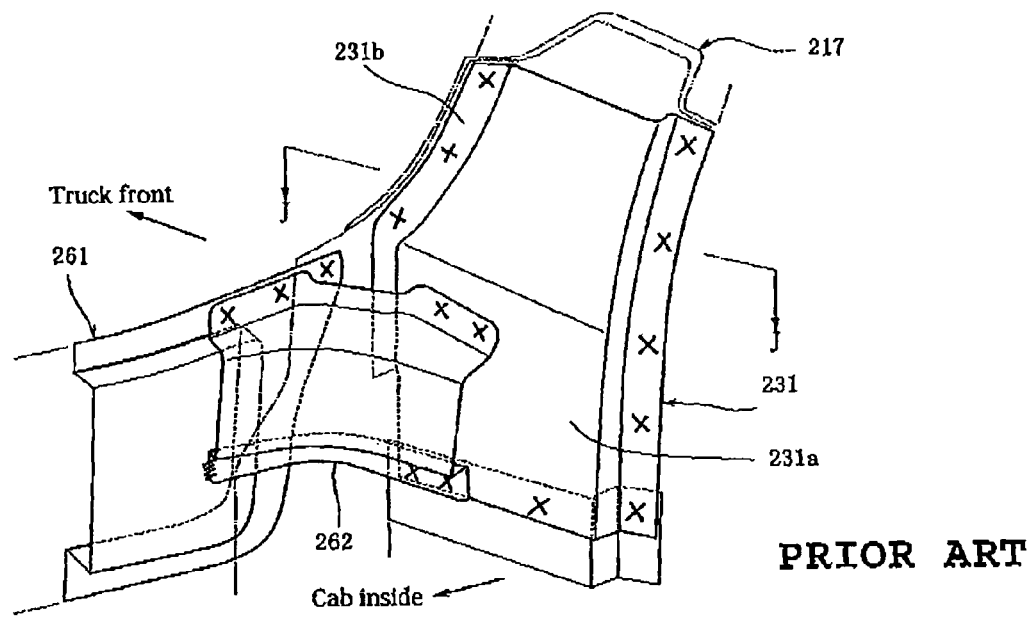
FIG. 23 is a perspective view of an essential portion corresponding to FIG. 5, showing conventional example 4.
Figure 24:
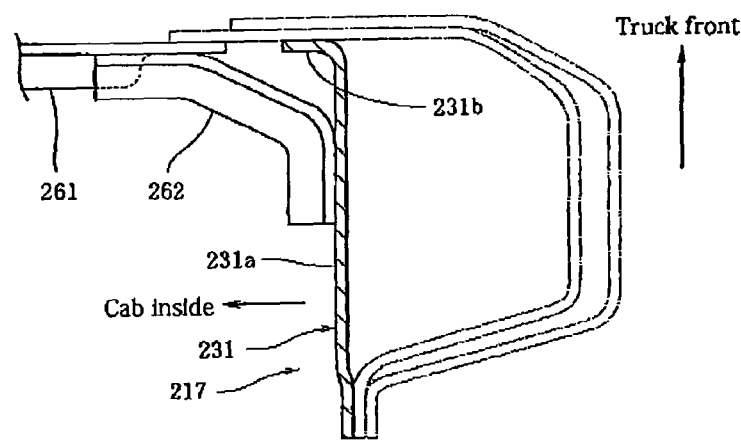
FIG. 24 is a sectional view taken along the line J-J of FIG. 23.

Further, in the above-described first embodiment, the header inner panel and the front edge of the roof panel are joined to each other to form the roof header member into a substantially tubular shape (substantially into a C shape). However, as shown in FIG. 19, the header front-side flange 44*b* of the header inner panel 44 and the roof front-side flange 45*c* of the roof panel 45 are joined to each other, and the header rear-side flange 44*c* of the header inner panel 44 and the front part of the roof panel 45 are joined to each other, by which the roof header member 41 may be formed into a tubular shape.

INDUSTRIAL APPLICABILITY

The vehicular front structure in accordance with the present invention can be applied to a front pillar in which stresses do not concentrate in an upper joint part and a lower joint part, and can improve the joint strength of the upper and lower parts of the front pillar.

The invention claimed is:

1. A front structure of a vehicle comprising a roof which comprises a roof panel, a roof header member, a roof side member, and an upper part of a front pillar, the upper part being joined to a side end part of the roof header member and a front end part of the roof side member by a joint panel, wherein the front pillar is provided between a side edge of a windshield glass and a front edge of a side door of the vehicle and is formed in a tubular shape by a joint of a pillar inner panel of the front pillar and a pillar outer panel of the front pillar, the roof header member is provided along an upper edge of the windshield glass and is formed into a substantially tubular shape by a joint of a header inner panel of the roof header member and the roof panel, the roof side member is provided along an upper edge of the side door and is formed into a substantially tubular shape by a joint of a side inner panel and a roof forming member, the joint panel is provided on a cab inside of the pillar inner panel, the pillar inner panel has an inner front-side flange which is provided so as to be substantially parallel with an inner surface of the windshield glass and to extend toward the side edge of the windshield glass, an upper part of the inner front-side flange is projected into the plane on which a side end part of the header inner panel is extended, the pillar outer panel has an outer front-side flange which is provided so as to be substantially parallel with the inner surface of the windshield glass and to extend in a direction opposite to the side edge of the windshield glass, a front lap part is formed by joining the pillar outer surface of the inner front-side flange and the pillar inner surface of the outer front-side flange to each other, and the side edge inner surface of the windshield glass is attached to the pillar outer surface of the front lap part.

2. The front structure of a vehicle according to claim 1, wherein the upper end part of the inner front-side flange is projected to a position at which the upper end part of the inner front-side flange laps on the front end part of the side inner panel.

3. The front structure of a vehicle according to claim 1, wherein an upper part of the pillar inner panel is joined to the front end part of the side inner panel.

* * * * *